US008571399B2

(12) United States Patent
Minamisawa et al.

(10) Patent No.: US 8,571,399 B2
(45) Date of Patent: Oct. 29, 2013

(54) PHOTOGRAPHIC OPTICAL DEVICE

(75) Inventors: Shinji Minamisawa, Nagano (JP); Toshiyuki Karasawa, Nagano (JP); Yuichi Takei, Nagano (JP); Tadashi Takeda, Nagano (JP); Akihiro Nagata, Nagano (JP); Hisahiro Ishihara, Nagano (JP); Kiyoshi Miyazaki, Nagano (JP); Katsushige Yanagisawa, Nagano (JP)

(73) Assignee: Nidec Sankyo Corporation (JP)

( * ) Notice: Subject to any disclaimer, the term of this patent is extended or adjusted under 35 U.S.C. 154(b) by 117 days.

(21) Appl. No.: 13/124,373

(22) PCT Filed: Oct. 8, 2009

(86) PCT No.: PCT/JP2009/005239
§ 371 (c)(1),
(2), (4) Date: Jul. 8, 2011

(87) PCT Pub. No.: WO2010/044223
PCT Pub. Date: Apr. 22, 2010

(65) Prior Publication Data
US 2011/0262122 A1    Oct. 27, 2011

(30) Foreign Application Priority Data
Oct. 14, 2008 (JP) ................................. 2008-264899

(51) Int. Cl.
*G03B 17/00* (2006.01)
(52) U.S. Cl.
USPC .......................................................... 396/55
(58) Field of Classification Search
USPC ................. 396/55; 348/208.99, 208.4, 208.7, 348/208.11
See application file for complete search history.

(56) References Cited

U.S. PATENT DOCUMENTS

| 7,324,134 | B2* | 1/2008 | Sato et al. | 348/208.2 |
| 2003/0043289 | A1* | 3/2003 | Konno | 348/335 |
| 2007/0109412 | A1 | 5/2007 | Hara | |
| 2010/0080545 | A1* | 4/2010 | Fan et al. | 396/55 |

FOREIGN PATENT DOCUMENTS

| JP | 2002-228903 A | 8/2002 |
| JP | 2002-357773 A | 12/2002 |
| JP | 2007-139965 A | 6/2007 |
| JP | 2007-310084 A | 11/2007 |
| JP | 2008-58391 A | 3/2008 |
| JP | 2008-122842 A | 5/2008 |
| JP | 2008-170864 A | 7/2008 |

OTHER PUBLICATIONS

International Search Report for INternational Application No. PCT/JP2009/005239 mailed Nov. 10, 2009 with English translation.

* cited by examiner

*Primary Examiner* — Clayton E Laballe
*Assistant Examiner* — Noam Reisner
(74) *Attorney, Agent, or Firm* — Cantor Colburn LLP

(57) ABSTRACT

An imaging optical device may include a movable module having a lens drive device on which a lens and an imaging element are mounted; a support body for supporting the movable module; a rocking drive mechanism for rocking the movable module; and a plate spring for rockably supporting the movable module. The plate spring is provided with a holding section for holding the movable module, a fixed section fixed to the support body, and a spring section for connecting the holding section and the fixed section to each other. The spring section can deform in the direction perpendicular to the optical axis and in the direction of the optical axis.

20 Claims, 12 Drawing Sheets

PHOTOGRAPHIC OPTICAL DEVICE

CROSS REFERENCE TO RELATED APPLICATIONS

This is a U.S. national stage of international application No. PCT/JP2009/005239, filed on Oct. 8, 2009. Priority under 35 U.S.C. §119(a) and 35 U.S.C. §365(b) is claimed from Japanese Application No. 2008-264899, filed Oct. 14, 2008, the disclosure of which is also incorporated herein by reference.

TECHNICAL FIELD

The present invention relates to a photographic optical device provided with a shake correcting function in which a lens drive device having a lens and an imaging element is swung to correct a shake.

BACKGROUND

In recent years, a portable device such as a cellular phone is mounted with a photographic optical device. In a portable device, a shake of hand is easily occurred at the time of photographing. In order to prevent this problem, an optical device has been proposed which is capable of correcting a shake of hand at the time of photographing (see, for example, Patent Literature 1).

An optical device described in Patent Literature 1 is provided with a movable part on which a lens and an imaging element are mounted, a pivot shaft which is fixed to a base of the optical device and abutted with a bottom face of the movable part, a flat spring which is fixed to the base and swingably supports the movable part, and a swing mechanism for swinging the movable part. In the optical device, the swing mechanism is structured of a drive coil and a drive magnet and the movable part is swung by a driving force of the swing mechanism with the pivot shaft as a supporting point to correct a shake of hand.

Further, in this optical device, the flat spring is provided with a fixed piece which is fixed to the base, an outer frame piece which is connected with the fixed piece through two X-axis deformable parts formed in a straight line shape, and a support piece for the movable part which is connected with the outer frame piece through two Y-axis deformable parts formed in a straight line shape. When the movable part is swung, the X-axis deformable parts and the Y-axis deformable parts are twisted. Further, the flat spring supports a bottom face side of the movable part and the flat spring is formed with a small diameter hole into which an upper end side of the pivot shaft is inserted.

PATENT LITERATURE

[PTL 1] Japanese Patent Laid-Open No. 2007-310084

However, in the optical device described in Patent Literature 1, the lengths of the X-axis deformable part and the Y-axis deformable part of the flat spring which are twisted when the movable part is swung are relatively short and a spring constant of the flat spring is relatively large. Therefore, in the optical device, when a swing angle of the movable part becomes larger, an urging force of the movable part by the flat spring becomes larger and thus the movable part may not be swung smoothly.

In view of the problem described above, at least an embodiment of the present invention provides a photographic optical device in which the lens drive device having a lens and an imaging element is capable of swinging smoothly to correct a shake appropriately.

SUMMARY

In order to solve the problem, at least an embodiment of the present invention provides a photographic optical device including a lens drive device on which a lens, an imaging element, and a lens drive mechanism for driving the lens are mounted, a movable module which is provided with the lens drive device, a support body which supports the movable module, and a shake correction mechanism which swings the movable module so that an optical axis of the lens drive device is inclined with respect to the support body to correct a shake. The shake correction mechanism includes a swing drive mechanism for swinging the movable module and a spring member which swingably supports the movable module. The spring member is provided with a holding part which holds the movable module, a fixing part which is fixed to the support body, and a spring part which connects the holding part with the fixing part and is capable of performing a swing operation of the movable module, and the spring part is deformable in a direction perpendicular to the optical axis and an optical axis direction.

In the photographic optical device in accordance with at least an embodiment of the present invention, the spring part structuring the spring member which swingably supports the movable module is deformable in both of a direction perpendicular to the optical axis of the lens drive device and the optical axis direction. Therefore, spring constants of the spring member in both of the direction perpendicular to the optical axis and the optical axis direction can be made relatively small. Accordingly, in at least an embodiment of the present invention, even when a swing angle of the movable module becomes larger, the movable module is swung smoothly (in other words, the lens drive device is swung smoothly) to correct a shake appropriately. Further, in at least an embodiment of the present invention, since the spring part is deformable in a direction perpendicular to the optical axis and thus plastic deformation of the spring part can be prevented when an impact is applied to the photographic optical device in a direction perpendicular to the optical axis.

In at least an embodiment of the present invention, it is preferable that the swing drive mechanism is provided with a plurality of drive magnets and a plurality of drive coils for swinging the movable module with a first direction and a second direction which are substantially perpendicular to the optical axis and substantially perpendicular to each other as axial directions, and the spring part is provided with a first spring part which is substantially parallel to the first direction and a second spring part which is substantially parallel to the second direction. According to this structure, a spring constant in the second direction of the spring member can be made relatively small by an operation of the first spring part which is substantially parallel to the first direction, and a spring constant in the first direction of the spring member can be made relatively small by an operation of the second spring member which is parallel to the second direction. Therefore, the holding part can be moved smoothly in the second direction by the first spring part and the holding part can be moved smoothly in the first direction by the second spring part. As a result, even when a swing angle of the movable module becomes larger, the movable module can be swung smoothly.

In at least an embodiment of the present invention, it is preferable that the spring part is formed in a substantially "L"-shape which is structured of the first spring part and the second spring part. According to this structure, for example, in comparison with a case that a spring part is formed so that a plurality of first spring parts and a plurality of second spring parts are connected with each other, the structure of the spring part can be simplified and the holding part can be moved smoothly in the first direction and the second direction.

In at least an embodiment of the present invention, the spring member is provided with a plurality of the spring parts and, for example, the first spring part of one spring part and the first spring part of another spring part are superposed on each other in the second direction, and the second spring part of one spring part and the second spring part of another spring part are superposed on each other in the first direction.

In at least an embodiment of the present invention, it is preferable that the movable module is formed in a substantially rectangular shape when viewed in the optical axis direction and whose outer peripheral face is disposed to be substantially parallel to the first direction or the second direction, and the spring member is formed in a substantially rectangular shape as a whole when viewed in the optical axis direction and an outer peripheral end of the spring member is disposed to be substantially parallel to the first direction or the second direction. In this case, for example, the first spring part and the second spring part are disposed between the outer peripheral face of the movable module and the outer peripheral end of the spring member. According to this structure, even when a space between the outer peripheral face of the movable module and the outer peripheral end of the spring member are narrow, the first spring part and the second spring part can be disposed in the space appropriately. Therefore, the size of the photographic optical device can be reduced in a direction perpendicular to the optical axis.

In at least an embodiment of the present invention, it is preferable that the spring member is formed in a substantially rectangular shape as a whole and an outer peripheral end of the spring member is disposed to be substantially parallel to the first direction or the second direction, and the fixing part is disposed at a substantially center of the first direction of the spring member and a substantially center of the second direction, and the holding part is formed so that an external shape of the holding part is a substantially rectangular shape, and the spring member is provide with the spring part which is formed from the substantially center of the holding part in the first direction toward the fixing part that is disposed at the substantially center of the second direction, and the spring part which is formed from the substantially center of the holding part in the second direction toward the fixing part that is disposed at the substantially center of the first direction. According to this structure, while the spring member is made smaller in a direction perpendicular to the optical axis, a length of the spring part can be relatively longer. Therefore, while reducing the size of the spring member in the direction perpendicular to the optical axis, a spring constant of the spring member can be made relatively small. Accordingly, while reducing the size of the spring member in the direction perpendicular to the optical axis, the movable module can be swung smoothly. Further, a stress applied to the spring part can be dispersed and a stable elasticity can be obtained.

In at least an embodiment of the present invention, it is preferable that a holding part side end of the spring part which is formed from the substantially center of the holding part in the first direction toward the fixing part that is disposed at the substantially center of the second direction and a fixing part side end of the spring part which is formed from the substantially center of the holding part in the second direction toward the fixing part that is disposed at the substantially center of the first direction are adjacent to each other in the first direction, and a holding part side end of the spring part which is formed from the substantially center of the holding part in the second direction toward the fixing part that is disposed at the substantially center of the first direction and a fixing part side end of the spring part which is formed from the substantially center of the holding part in the first direction toward the fixing part that is disposed at the substantially center of the second direction are adjacent to each other in the second direction. According to this structure, while the spring member is made smaller in a direction perpendicular to the optical axis, a length of the spring part can be relatively longer.

In at least an embodiment of the present invention, it is preferable that the movable module is formed in a substantially rectangular shape when viewed in the optical axis direction, the spring member is formed in a substantially rectangular shape as a whole, the fixing part is disposed at four corners of the spring member, the holding part is disposed at four corners or vicinities of the four corners of the movable module when viewed in the optical axis direction. The spring part is formed to connect the holding part with the fixing part which are disposed on a substantially diagonal line of the spring member, and the first spring part of one spring part and the first spring part of another spring part are superposed on each other in the second direction, and the second spring part of one spring part and the second spring part of another spring part are superposed on each other in the first direction. According to this structure, a length of the spring part can be made longer. Therefore, a spring constant of the spring member can be made relatively small and the movable module can be swung smoothly. Further, a stress applied to the spring part can be dispersed and a stable elasticity can be obtained.

Further, in this case, the spring member is, for example, structured of four spring pieces in a substantially "L"-shape each of which is provided with the one holding part, the one fixing part, and the one spring part.

In at least an embodiment of the present invention, it is preferable that the movable module is formed in a substantially rectangular shape when viewed in the optical axis direction and whose outer peripheral face is disposed to be substantially parallel to the first direction or the second direction, the spring member is formed in a substantially rectangular shape as a whole and an outer peripheral end of the spring member is disposed to be substantially parallel to the first direction or the second direction, the fixing part is disposed at a substantially center of the first direction of the spring member and a substantially center of the second direction, and the holding part is disposed at four corners or vicinities of the four corners of the movable module when viewed in the optical axis direction. The spring member is provided with the spring part having a first turn-around spring part which is formed to be turned around in the first direction as the first spring part, and the spring part having a second turn-around spring part which is formed to be turned around in the second direction as the second spring part. According to this structure, even when a distance between the holding part and the fixing part is short, a length of the spring part can be relatively long. Therefore, a spring constant of the spring member can be made relatively small and the movable module can be swung smoothly. Further, a stress applied to the spring part can be dispersed and a stable elasticity can be obtained.

Further, in this case, the spring member is, for example, structured of two spring pieces each of which is provided with two holding parts, two fixing parts, one spring part having the first turn-around spring part, and one spring part having the second turn-around spring part.

In at least an embodiment of the present invention, it is preferable that the spring member is disposed in a vicinity of a swing center of the movable module in the optical axis direction. According to this structure, a deformed amount of the spring part can be made small in the direction perpendicular to the optical axis. Therefore, the size of the spring part can be made smaller.

In at least an embodiment of the present invention, the spring member is disposed on a swing center side of the movable module with respect to the swing drive mechanism in the optical axis direction.

In at least an embodiment of the present invention, it is preferable that a spring constant of the spring part in the optical axis direction is not more than a spring constant of the spring part in a direction perpendicular to the optical axis. According to this structure, even when vibration having a component in a direction perpendicular to the optical axis is applied to the photographic optical device from the outside, the vibration of the movable module can be restrained.

In at least an embodiment of the present invention, the movable module is provided with a sensor for detecting a variation of inclination of the lens drive device.

As described above, in the photographic optical device in accordance with at least an embodiment of the present invention, the lens drive device can be swung smoothly to correct a shake appropriately.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DESCRIPTION OF EMBODIMENTS

Embodiments of the present invention will be described below with reference to the accompanying drawings.

First Embodiment (Entire Structure of Photographic Optical Device)

Figure 1:
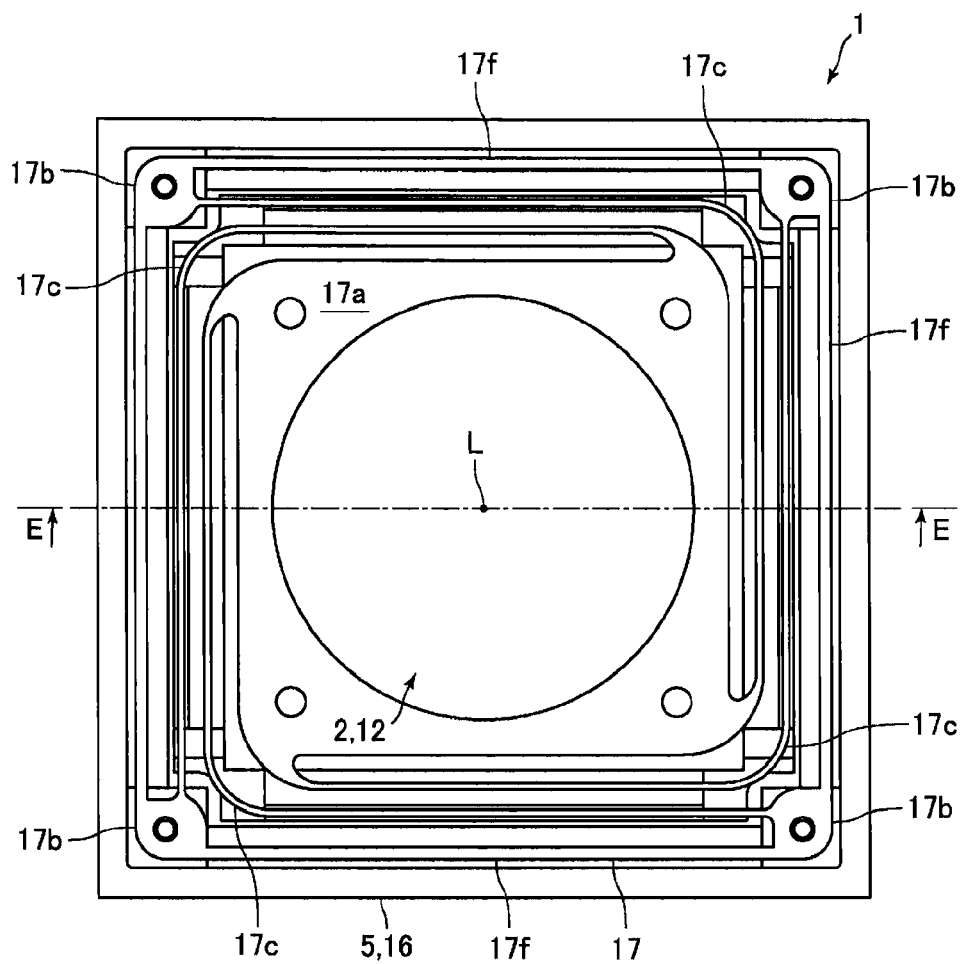
FIG. 1 is a plan view showing a photographic optical device in accordance with a first embodiment of the present invention.
Figure 1:
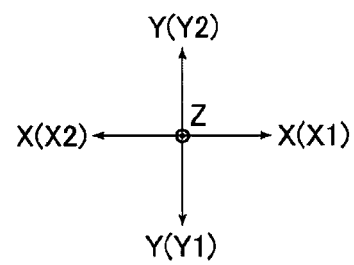
Figure 2:
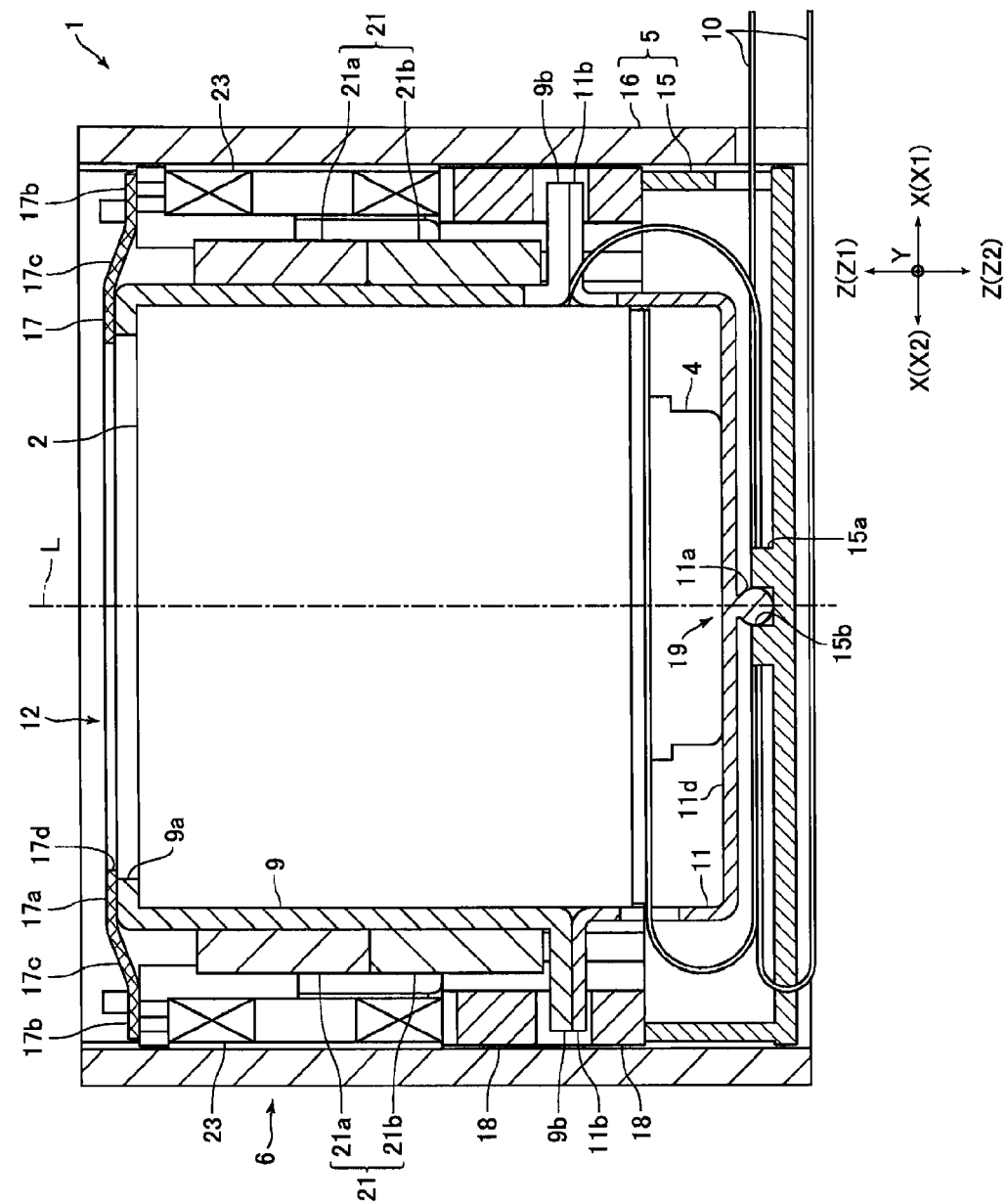
FIG. 2 is a cross-sectional view showing the "E-E" cross section in FIG. 1.
Figure 3:
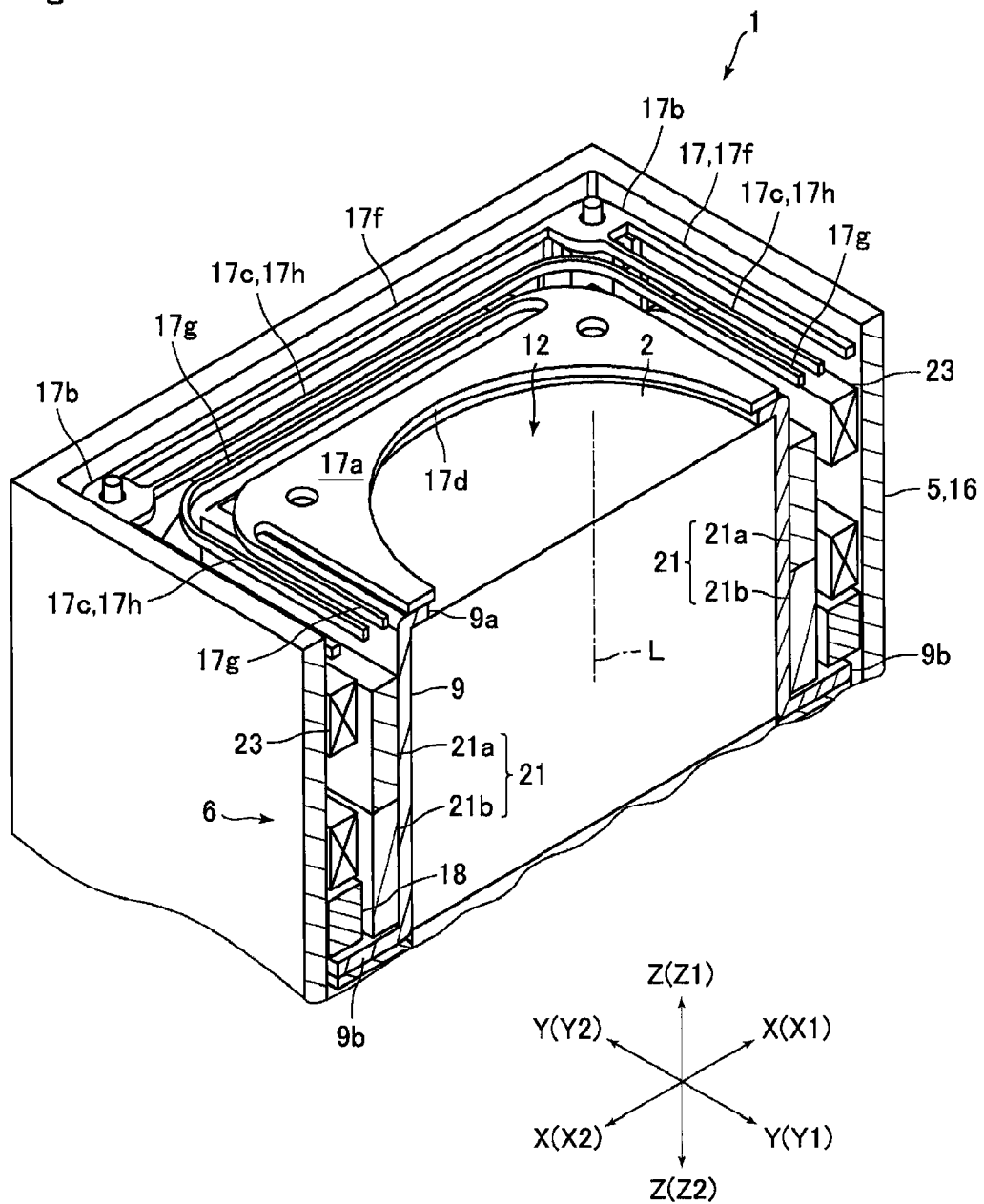
FIG. 3 is a perspective view showing a part of the structure in the "E-E" cross section in FIG. 1.

FIG. 1 is a plan view showing a photographic optical device 1 in accordance with a first embodiment of the present invention. FIG. 2 is a sectional view showing the "E-E" cross section in FIG. 1. FIG. 3 is a perspective view showing a part of the structure in the "E-E" cross section in FIG. 1.

In the following description, as shown in FIGS. 1 through 3, three directions perpendicular to each other are set to be an X-axis, a Y-axis and a Z-axis. Further, an "X1" direction side in FIGS. 1 through 3 is referred to as a "right" side, an "X2" direction side is as a "left" side, a "Y1" direction side is as a "front" side, a "Y2" direction side is as a "rear" side, a "Z1" direction side is an "upper" side, and a "Z2" direction side is as a "lower" side.

The photographic optical device 1 in this embodiment is a small and thin camera, which is mounted on a portable apparatus such as a cellular phone, and is generally formed in a substantially rectangular prism shape. The photographic optical device 1 includes, as shown in FIGS. 1 through 3, a lens drive device 2 on which a lens and an imaging element not shown are mounted, a sensor 4 for detecting inclination of the lens drive device 2, a support body 5 supporting the lens drive device 2, and a swing drive mechanism 6 for swinging the lens drive device 2 so that an optical axis "L" of the lens drive device 2 is inclined. In this embodiment, the "Z" direction (up-and-down direction) is coincided with a direction of an optical axis "L" (optical axis direction) of the photographic optical device 1 when the lens drive device 2 is not swung. However, the maximum swing angle of the lens drive device 2 is slight (for example, about 2°) and thus, even when the lens drive device 2 is swung, the up-and-down direction and the optical axis direction are substantially coincided with each other.

The lens drive device 2 is, as described above, mounted with a lens and an imaging element. Specifically, the lens is mounted on an upper end side of the lens drive device 2 and the imaging element is mounted on a lower end of the lens drive device 2. Further, the lens drive device 2 is mounted with a lens drive mechanism for driving the lens in an optical axis direction. The lens drive mechanism is, for example, structured of drive coils and drive magnets.

The lens drive device 2 is generally formed in a roughly rectangular prism shape. In other words, the lens drive device 2 is formed so that its shape when viewed in the optical axis direction is formed in a substantially rectangular shape. Specifically, the lens drive device 2 is formed so that its shape when viewed in the optical axis direction is formed in a substantially square shape. Further, the lens drive device 2 is disposed so that its outer peripheral face is substantially parallel to the right and left direction or the front and rear direction.

Front and rear side faces and right and left side faces of the lens drive device 2 are covered by a cover member 9 which is formed in a substantially rectangular tube shape. The cover member 9 is provided with a bottom part and its lower end is opened. The cover member 9 is formed of magnetic material. The bottom part of the cover member 9 which is disposed on an upper end side is formed with a circular through hole 9a. Further, a lower end of the cover member 9 is formed with a flange part 9b which is extended toward outer sides in the front and rear direction and toward outer sides in the right and left direction. A drive magnet 21 described below which structures a swing drive mechanism 6 is fixed to each of the front and rear side faces and the right and left side faces of the cover member 9.

A sensor 4 is a gyroscope for detecting a variation of inclination of the lens drive device 2. In other words, the sensor 4 is an angular velocity sensor for detecting an angular velocity of the lens drive device 2. The sensor 4 is disposed on a lower side of the lens drive device 2. The sensor 4 is connected with a flexible printed circuit board (FPC) 10. The FPC 10 is also connected with the imaging element which is mounted on the lens drive device 2. Further, the FPC 10 is disposed and extended on the lower end side of the photographic optical device 1 and, for example, the FPC 10 is drawn out through the right side face of the photographic optical device 1.

Further, the sensor 4 is disposed in the inside of a sensor cover member 11 whose upper end is opened and which is formed in a bottomed flat shape and in a substantially rectangular tube shape. Specifically, the sensor 4 is disposed in the inside of the sensor cover member 11 so as to be abutted with an upper face of a bottom part 11d of the sensor cover member 11 which is disposed on its lower end side. The sensor cover member 11 is disposed so that the optical axis "L" passes through the center of the bottom part 11d. A supporting point protruded part 11a which is a supporting point for swinging the lens drive device 2 is formed at the center of the bottom part 11d so as to protrude toward the lower side. The supporting point protruded part 11a is formed in a substantially spherical shape.

An upper end of the sensor cover member 11 is formed with a flange part 11b, which is abutted with the flange part 9b of the cover member 9 from the lower side, so as to extend toward the outer side in the front and rear direction and toward the outer side in the right and left direction. In this embodiment, the flange part 9b and the flange part 11b are fixed to each other. In other words, the sensor cover member 11 is fixed to the lower end of the cover member 9.

In this embodiment, the lens drive device 2, the sensor 4, the cover member 9 and the sensor cover member 11 are supported by the support body 5 so as to be capable of swinging. In other words, a movable module 12 which is capable of swinging with respect to the support body 5 is structured of the lens drive device 2, the sensor 4, the cover member 9 and the sensor cover member 11. The movable module 12 is formed so that its shape when viewed in the optical axis direction is formed in a substantially rectangular shape. Specifically, the movable module 12 is formed so that its shape when viewed in the optical axis direction is formed in a substantially square shape.

The support body 5 is provided with a base body 15 which structures an under face of the photographic optical device 1 and a case body 16 which structures outer peripheral faces in the front and rear sides and the right and left sides of the photographic optical device 1. The case body 16 is fixed with a flat spring 17 as a spring member which swingably supports the movable module 12, and a stopper member 18 for restricting a swing range of the movable module 12.

The base body 15 is formed so that its upper end is opened and formed in a bottomed flat and a substantially rectangular tube shape. A substantially center of a bottom part of the base body 15 is formed with a protruded part 15a which protrudes toward the upper side. The protruded part 15a is formed with an engaging recessed part 15b, which engages with the supporting point protruded part 11a, so as to be recessed from an upper face of the protruded part 15a. The engaging recessed part 15b is formed in a cylindrical face shape whose cross sectional shape perpendicular to the up-and-down direction is circular. Further, a diameter of the engaging recessed part 15b is set to be slightly larger than that of the supporting point protruded part 11a which is formed in a substantially spherical shape and the supporting point protruded part 11a is abutted with a bottom face of the engaging recessed part 15b. In accordance with an embodiment of the present invention, the engaging recessed part 15b may be formed in a hemispherical shape whose diameter is slightly larger than that of the supporting point protruded part 11a or may be formed in a conical shape whose diameter is gradually reduced toward the lower direction.

In this embodiment, a supporting point part 19 which is a swing center of the movable module 12 (swing center of the lens drive device 2) is structured of the supporting point protruded part 11a and the engaging recessed part 15b. In other words, the swing center of the movable module 12 is disposed on a lower side of the movable module 12. The supporting point part 19 is disposed at a position where the optical axis "L" of the lens drive device 2 passes. Further, the optical axis "L" of the lens drive device 2 is disposed at the center of the movable module 12. In accordance with an embodiment of the present invention, a lubricant is preferably applied to an inner peripheral face of the engaging recessed part 15b for suppressing abrasion of the supporting point protruded part 11a and the inner peripheral face of the engaging recessed part 15b.

The case body 16 is formed in a substantially rectangular tube shape whose upper end and lower end are opened. The base body 15 is fixed to the lower end of the case body 16. The case body 16 in this embodiment is formed of nonmagnetic metal material.

The flat spring 17 is formed in a substantially rectangular shape as a whole. Specifically, the flat spring 17 is formed in a substantially square shape. Further, the flat spring 17 is disposed so that its outer peripheral end is substantially parallel to the right and left direction or to the front and rear direction. Four corners of the flat spring 17 are fixed to four corners of an upper end of the case body 16. Further, a center part of the flat spring 17 is fixed with an upper end of the movable module 12 (specifically, an upper end of the cover member 9). In other words, in this embodiment, the movable module 12 is disposed (in other words, the lens drive device 2 is disposed) between the supporting point part 19 and the flat spring 17 in the optical axis direction. A detailed structure of the flat spring 17 will be described below. In this embodiment, specifically, the flat spring 17 is fixed to the case body 16 through a predetermined attaching member. In other words, four corners of the flat spring 17 are fixed to an attaching member which is fixed to an inner peripheral face of the case body 16.

A stopper member 18 is fixed to an inner peripheral face of the case body 16. Specifically, two stopper members 18 are respectively fixed to the inner peripheral face of the case body 16 at a position which is capable of abutting with an upper face of the flange part 9b of the cover member 9 and at a position which is capable of abutting with an under face of the flange part 11b of the sensor cover member 11. A swing range of the movable module 12 is restricted by the stopper members 18 and the flange parts 9b and 11b.

The swing drive mechanism 6 is provided with drive magnets 21 and drive coils 23 which are oppositely disposed to the drive magnets 21. The swing drive mechanism 6 in this embodiment is provided with four drive magnets 21 and four drive coils 23.

The drive magnet 21 is formed in a substantially rectangular plate shape. Further, the drive magnet 21 is structured of two magnet pieces, i.e., a first magnet piece 21a and a second magnet piece 21b. Specifically, the first magnet piece 21a and the second magnet piece 21b are adhesively fixed to each other to structure the drive magnet 21 in the state where an under face of the first magnet piece 21a and an upper face of the second magnet piece 21b are abutted with each other.

One piece of the drive magnet 21 is fixed to respective front and rear side faces and right and left side faces of the cover member 9 and the drive magnets 21 are disposed in the inside of the case body 16. The drive magnets 21 are swung together with the lens drive device 2. As described above, the cover member 9 is formed of magnetic material and thus the cover member 9 functions as a back yoke for the drive magnets 21.

In this embodiment, the drive magnets 21 fixed to the right and left side faces of the cover member 9 are magnetized so that a magnetic pole formed on the right face of the drive magnet 21 is different from a magnetic pole formed on its left face. Further, the drive magnets 21 fixed to the right and left side faces of the cover member 9 are magnetized so that magnetic poles formed on outer side faces of the first magnet pieces 21a in the right and left direction are different from magnetic poles formed on outer side faces of the second magnet pieces 21b. In other words, magnetic poles formed on inner side faces of the first magnet pieces 21a in the right and left direction are magnetized so as to be different from magnetic poles formed on inner side faces of the second magnet pieces 21b.

Similarly, the drive magnets 21 fixed to the front and rear side faces of the cover member 9 are magnetized so that a magnetic pole formed on the front face of the drive magnet 21 is different from a magnetic pole formed on its rear face. Further, the drive magnets 21 fixed to the front and rear side faces of the cover member 9 are magnetized so that magnetic poles formed on outer side faces of the first magnet pieces 21a in the front and rear direction are different from magnetic poles formed on outer side faces of the second magnet pieces 21b.

For example, a right side face of the first magnet piece 21a of the drive magnet 21 which is fixed to the right side face of the cover member 9 is magnetized to be an "S"-pole and its left side face is magnetized to be an "N"-pole, and a right side face of the second magnet piece 21b of the drive magnet 21 is magnetized to be an "N"-pole and its left side face is magnetized to be an "S"-pole. Similarly, a left side face of the first magnet piece 21a of the drive magnet 21 which is fixed to the left side face of the cover member 9 is magnetized to be an "S"-pole and its right side face is magnetized to be an "N"-pole, and a left side face of the second magnet piece 21b of the drive magnet 21 is magnetized to be an "N"-pole and its right side face is magnetized to be an "S"-pole.

Further, for example, a rear side face of the first magnet piece 21a of the drive magnet 21 which is fixed to the rear side face of the cover member 9 is magnetized to be an "N"-pole and its front side face is magnetized to be an "S"-pole, and a rear side face of the second magnet piece 21b of the drive magnet 21 is magnetized to be an "S"-pole and its front side face is magnetized to be an "N"-pole. Similarly, a front side face of the first magnet piece 21a of the drive magnet 21 which is fixed to the front side face of the cover member 9 is magnetized to be an "N"-pole and its rear side face is magnetized to be an "S"-pole, and a front side face of the second magnet piece 21b of the drive magnet 21 is magnetized to be an "S"-pole and its rear side face is magnetized to be an "N"-pole.

The drive coil 23 is an air-core coil which is structured so that a fusion wire provided with insulation coating covering around a conducting wire and a fusion coating further covering around the insulation coating is wound around in an air core shape (i.e., without a winding core such as a coil bobbin). The drive coil 23 is formed so that a fusion wire is wound around in a substantially rectangular shape. The drive coil 23 is fixed by one piece to each of the front and rear side faces and the right and left side faces of the case body 16 through an insulating film.

As shown in FIG. 2, the drive magnets 21 and the drive coils 23 are oppositely disposed to each other through a predetermined gap space. Specifically, the drive magnets 21 and the drive coils 23 are oppositely disposed to each other through a predetermined gap space so that the drive magnets 21 are not contacted with the drive coils 23 even when the movable module 12 is swung with the supporting point part 19 as the supporting point. In this embodiment, when an electric current is not supplied to the drive coils 23, as shown in FIG. 2, the movable module 12 is located at a neutral position where the movable module 12 is not inclined with respect to the support body 5.

Further, in this embodiment, as shown in FIG. 2, the drive magnets 21 and the drive coils 23 are oppositely disposed so that the center position of the drive coil 23 in the upper and lower direction is located on an upper side relative to the abutting face of the first magnet piece 21a with the second magnet piece 21b.

Further, in this embodiment, the drive magnets 21 and the drive coils 23 are oppositely disposed to each other in the right and left direction or in the front and rear direction, and a drive force for swinging the movable module 12 with the front and rear direction as an axial direction of swing is generated by the drive magnets 21 and the drive coils 23 which are oppositely disposed in the right and left direction. (In other words, the movable module 12 is swung around the Y-axis.) Further, a drive force for swinging the movable module 12 with the right and left direction as an axial direction of swing is generated by the drive magnets 21 and the drive coils 23 which are oppositely disposed in the front and rear direction. (In other words, the movable module 12 is swung around the X-axis.) In this embodiment, the right and left direction ("X" direction) is the first direction which is substantially perpendicular to the optical axis direction, and the front and rear direction ("Y" direction) is the second direction which is substantially perpendicular to the right and left direction, i.e., the first direction and to the optical axis direction.

In the photographic optical device 1 structured as described above, when a variation of inclination of the lens drive device 2 is detected with the sensor 4, (in other words, when a shake (vibration) of the lens drive device 2 is detected), an electric current is supplied to the drive coils 23 on the basis of a detection result of the sensor 4 and the movable module 12 is swung to make the optical axis "L" incline with the supporting point part 19 as a center and the shake is corrected. Specifically, when a shake of hand is detected on the basis of a detection result by the sensor 4 in the photographic optical device 1, an electric current is supplied to the drive coils 23 and the movable module 12 is swung (turned) to make the optical axis "L" incline with the supporting point part 19 as a center to correct the shake.

In this embodiment, the shake correction mechanism for correcting a shake of hand is structured in which the movable module 12 is swung (in other words, the lens drive device 2 is swung) so as to make the optical axis "L" of the lens drive device 2 incline with respect to the support body 5 by utilizing the supporting point part 19 comprised of the supporting point protruded part 11a and the engaging recessed part 15b, the swing drive mechanism 6 and the flat spring 17.

(Structure of Flat Spring)

Figure 4:
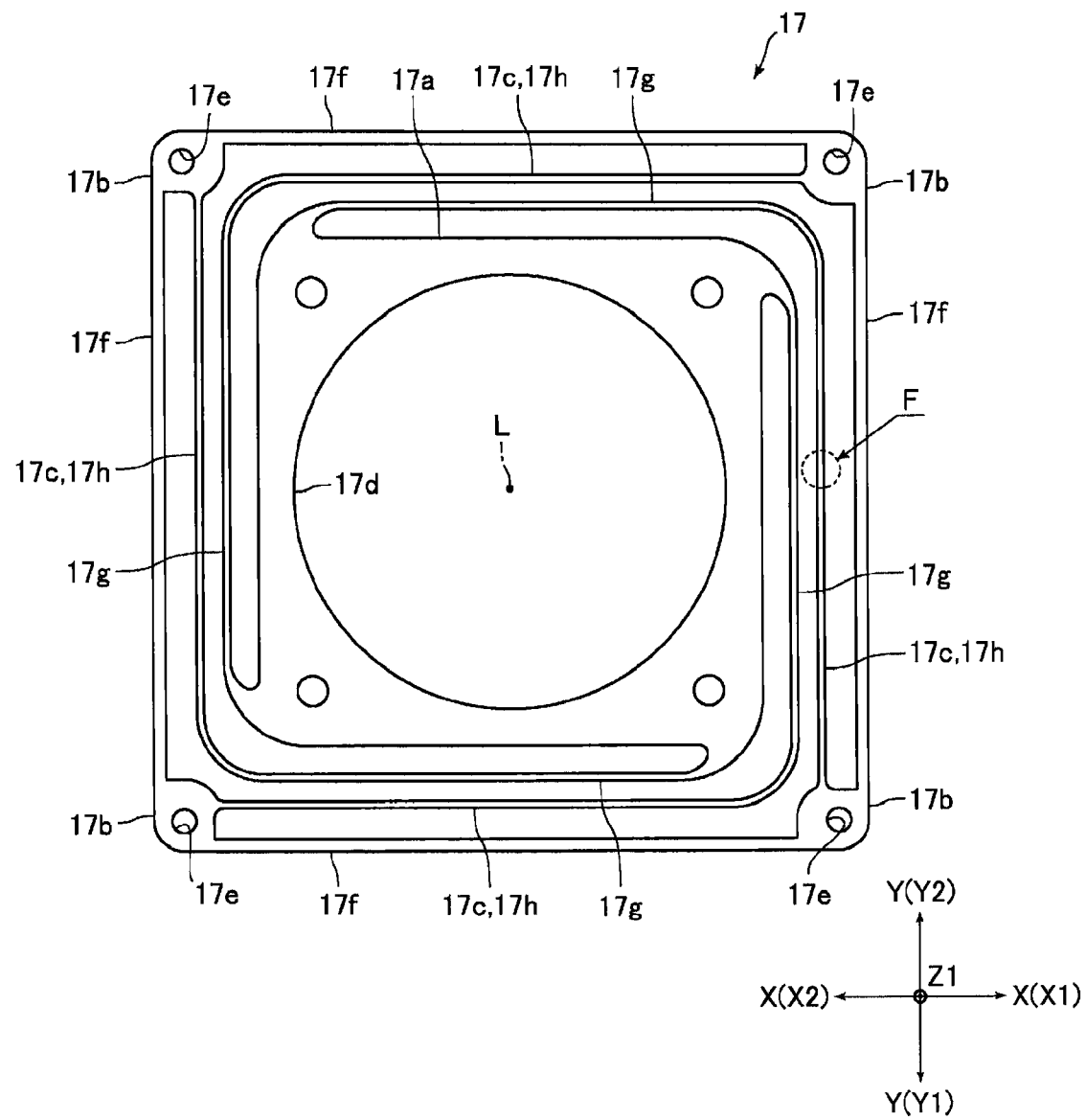
FIG. 4 is a plan view showing a flat spring in FIG. 3.
Figure 5:
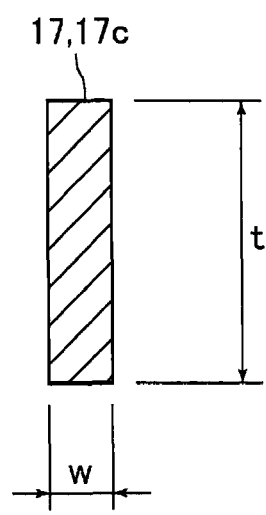
FIG. 5 is a longitudinal sectional view showing the "F" part in FIG. 4.

FIG. 4 is a plan view showing the flat spring 17 in FIG. 3. FIG. 5 is a longitudinal sectional view showing the "F" part in FIG. 4.

The flat spring 17 is, as shown in FIG. 4, provided with a holding part 17a which holds the movable module 12, four fixing parts 17b which are fixed to the case body 16, and four spring parts 17c which connect the holding part 17a with the fixing parts 17b. In this embodiment, a swing operation of the movable module 12 which is held by the holding part 17a can be performed by means of that the spring parts 17c are resiliently bent with respect to the fixing parts 17b.

The holding part 17a is formed in a substantially square shape. A circular through hole 17d is formed at a center of the holding part 17a. The through hole 17d is formed so that the optical axis "L" is passed through its center. The movable module 12 is fixed to the holding part 17a. Specifically, as shown in FIG. 2, an upper face of the bottom part of the cover member 9 is fixed to the under face of the holding part 17a.

The fixing part 17b is disposed at four corners of the flat spring 17 which is formed a substantially square shape. The fixing part 17b is formed with a circular fixing hole 17e for fixing the flat spring 17 to the case body 16.

The spring part 17c is disposed on the outer peripheral side of the holding part 17a. The spring part 17c is formed in a substantially "L"-shape. Specifically, the spring parts 17c are formed in a roughly spiral shape from four corners of the holding part 17a to the fixing parts 17b and are formed in a substantially "L"-shape which is structured of an inner side spring part 17g, which is formed in a straight line shape and disposed on an inner side in the right and left direction or the front and rear direction, and an outer side spring part 17h which is formed in a straight line shape and disposed on an outer side in the right and left direction or the front and rear direction.

More specifically, a first spring part 17c is structured of an inner side spring part 17g, which is formed from a right side front end of the holding part 17a to the left direction, and an outer side spring part 17h which is formed from the left end of the inner side spring part 17g to the rear direction and connected with the fixing part 17b that is disposed at the left side rear end. Further, a second spring part 17c is structured of an inner side spring part 17g, which is formed from a left side front end of the holding part 17a to the rear direction, and an outer side spring part 17h which is formed from the rear end of the inner side spring part 17g to the right direction and connected with the fixing part 17b that is disposed at the right side rear end. In addition, a third spring part 17c is structured of an inner side spring part 17g, which is formed from a left side rear end of the holding part 17a to the right direction, and an outer side spring part 17h which is formed from the right end of the inner side spring part 17g to the front direction and connected with the fixing part 17b that is disposed at the right side front end. Further, a fourth spring part 17c is structured of an inner side spring part 17g, which is formed from a right side rear end of the holding part 17a to the front direction, and an outer side spring part 17h which is formed from the front end of the inner side spring part 17g to the left direction and connected with the fixing part 17b that is disposed at the left side front end.

Further, the inner side spring part 17g of the first spring part 17c and the outer side spring part 17h of the fourth spring part 17c are superposed on each other in the front and rear direction on the front end side of the flat spring 17. The inner side spring part 17g of the second spring part 17c and the outer side spring part 17h of the first spring part 17c are superposed on each other in the right and left direction on the left end side of the flat spring 17. The inner side spring part 17g of the third spring part 17c and the outer side spring part 17h of the second spring part 17c are superposed on each other in the front and rear direction on the rear end side of the flat spring 17. The inner side spring part 17g of the fourth spring part 17c and the outer side spring part 17h of the third spring part 17c are superposed on each other in the right and left direction on the right end side of the flat spring 17.

Further, the inner side spring part 17g of the first spring part 17c and the outer side spring part 17h of the fourth spring part 17c are substantially parallel to each other. The inner side spring part 17g of the second spring part 17c and the outer side spring part 17h of the first spring part 17c are substantially parallel to each other. The inner side spring part 17g of the third spring part 17c and the outer side spring part 17h of the second spring part 17c are substantially parallel to each other. The inner side spring part 17g of the fourth spring part 17c and the outer side spring part 17h of the third spring part 17c are substantially parallel to each other.

As described above, in this embodiment, four spring parts 17c are disposed in a substantially point symmetrical manner with respect to the optical axis "L" which passes through the center of the holding part 17a. Further, in this embodiment, the inner side spring part 17g and the outer side spring part 17h which are substantially parallel to the right and left direction are the first spring part, and the inner side spring part 17g and the outer side spring part 17h which are substantially parallel to the front and rear direction are the second spring part. In other words, the spring part 17c in this embodiment is structured of the first spring part which is substantially parallel to the right and left direction and the second spring part which is substantially parallel to the front and rear direction, and the spring part 17c is capable of deforming in the right and left direction and the front and rear direction. Further, the spring part 17c in this embodiment is also capable of deforming in the up-and-down direction.

In this embodiment, a spring constant of the spring part 17c in the right and left direction and a spring constant of the spring part 17c in the front and rear direction are set to be not more than a spring constant of the spring part 17c in the optical axis direction. Specifically, the spring part 17c is, as shown in FIG. 5, formed so that its width "w" is not more than its thickness "t". For example, the width "w" of the spring part 17c is 0.13-0.15 mm, and the thickness "t" of the spring part 17c is 0.15 mm.

Further, in this embodiment, a connected portion of the inner side spring part 17g with the outer side spring part 17h which structures one spring part 17c is formed so that its shape when viewed in the optical axis direction is a substantially circular arc shape. Specifically, the connected portion of the inner side spring part 17g with the outer side spring part 17h which structures one spring part 17c is formed so that its shape when viewed in the optical axis direction is a substantially one-quarter (¼) circular arc shape. Further, in this embodiment, the connected portion of the inner side spring part 17g with the outer side spring part 17h which structures one spring part 17c, the connected portion of the holding part 17a with the inner side spring part 17g, and the fixing part 17b are disposed at each of four corners of the flat spring 17.

As shown in FIG. 4, four fixing parts 17b are connected with each other through connecting parts 17f in the right and left direction and the front and rear direction. Specifically, the fixing parts 17b of the flat spring 17 which are adjacent to each other in the circumferential direction are connected with each other by the connecting parts 17f in a straight line shape which are disposed at both front and rear ends and both right and left ends of the flat spring 17.

The flat spring 17 is fixed to the case body 16 in a resiliently bent state for generating pressurization so that the supporting point protruded part 11a of the sensor cover member 11 and the bottom face of the engaging recessed part 15b of the base body 15 are surely abutted with each other (in other words, so as to generate an urging force for urging the movable module 12 to the lower direction) (see FIG. 2). In other word, the fixing parts 17b are fixed to the case body 16 in a state that the fixing parts 17b are located at lower sides with respect to the holding part 17a.

The urging force to the lower direction generated in the movable module 12 by the flat spring 17 is, for example, in a case that the photographic optical device 1 is mounted on a cellular phone, set to be a magnitude that the supporting point protruded part 11a and the engaging recessed part 15b are not separated from each other even when the photographic optical device 1 is vibrated due to the vibration function of the cellular phone. For example, when a total mass of the movable module 12 and the drive magnets 21 is set to be "M" and a vibration acceleration when the cellular phone is vibrated is set to be "α", an urging force "F" to the lower direction generated in the movable module 12 by the flat spring 17 is set to satisfy the following Expression (1).

$$F > \alpha \times M \quad \text{Expression (1)}$$

In this embodiment, the vibration acceleration "α" is, for example, not less than 4 G.

Principal Effects in this Embodiment

As described above, in this embodiment, the spring part 17c of the flat spring 17 which swingably supports the movable module 12 is capable of deforming in the right and left direction, the front and rear direction and the up-and-down direction. Therefore, spring constants of the flat spring 17 in all directions of the right and left direction, the front and rear direction and the up-and-down direction can be made relatively small. Accordingly, in this embodiment, even when a swing angle of the movable module 12 becomes large, the movable module 12 is capable of swinging smoothly (in other words, the lens drive device 2 is swung smoothly) to correct a shake appropriately. Further, in this embodiment, since the spring part 17c is capable of deforming in the right and left direction and the front and rear direction, plastic deformation of the spring part 17c can be prevented in a case when an impact is applied to the photographic optical device 1 in the right and left direction and the front and rear direction.

In this embodiment, the spring part 17c is provided with the first spring part which is substantially parallel to the right and left direction and the second spring part which is substantially parallel to the front and rear direction. Therefore, a spring constant of the flat spring 17 in the front and rear direction can be set relatively small by an operation of the first spring part and a spring constant of the flat spring 17 in the right and left direction can be set relatively small by an operation of the second spring member. Accordingly, the holding part 17a can be moved smoothly to the front and rear direction by the first spring part and the holding part 17a can be moved smoothly to the right and left direction by the second spring part.

Further, in this embodiment, the spring part 17c is formed in a substantially "L"-shape which is structured of the first spring part and the second spring part. Therefore, for example, in comparison with a case that the spring part 17c is formed so that a plurality of the first spring parts and a plurality of the second spring parts are connected with each other, the structure of the spring part 17c is simplified and the holding part 17a can be moved smoothly in the right and left direction and the front and rear direction.

In this embodiment, the spring parts 17c which are formed in a substantially "L"-shape by using the inner side spring part 17g and the outer side spring part 17h are formed from four corners of the holding part 17a toward the fixing parts 17b which are disposed at four corners of the flat spring 17. Therefore, a length of the spring part 17c can be made longer. Especially, in this embodiment, the inner side spring part 17g of the first spring part 17c and the outer side spring part 17h of the fourth spring part 17c are substantially parallel to each other, the inner side spring part 17g of the second spring part 17c and the outer side spring part 17h of the first spring part 17c are substantially parallel to each other, the inner side spring part 17g of the third spring part 17c and the outer side spring part 17h of the second spring part 17c are substantially parallel to each other, and the inner side spring part 17g of the fourth spring part 17c and the outer side spring part 17h of the third spring part 17c are substantially parallel to each other. Further, the connected portion of the inner side spring part 17g with the outer side spring part 17h which structure one spring part 17c, the connected portion of the holding part 17a with the inner side spring part 17g, and the fixing part 17b are disposed at each of four corners of the flat spring 17. Therefore, a length of the spring part 17c can be made further longer. Accordingly, a spring constant of the flat spring 17 can be set further smaller. Further, since a length of the spring part 17c can be made longer, displacement amounts of the spring part 17c in the right and left direction, the front and rear direction, and the up-and-down direction can be increased.

In this embodiment, the connected portion of the inner side spring part 17g with the outer side spring part 17h structuring one spring part 17c is formed so that its shape when viewed in the optical axis direction is a substantially circular arc shape. Therefore, stress concentration of bending stress can be reduced at the connected portion of the inner side spring part 17g with the outer side spring part 17h. Accordingly, plastic deformation of the spring part 17c can be prevented.

In this embodiment, the width "w" of the spring part 17c is set to be not more than the thickness "t" of the spring part 17c. Therefore, the spring part 17c is easily deformed in the right and left direction and the front and rear direction. Accordingly, even when the flat spring 17 is disposed on the upper end side of the movable module 12 where variation amounts in the right and left direction and the front and rear direction become larger when the movable module 12 is swung, the holding part 17a which holds the movable module 12 can be moved smoothly and thus a swing operation of the movable module 12 can be performed smoothly.

Second Embodiment (Entire Structure of Photographic Optical Device)

Figure 6:
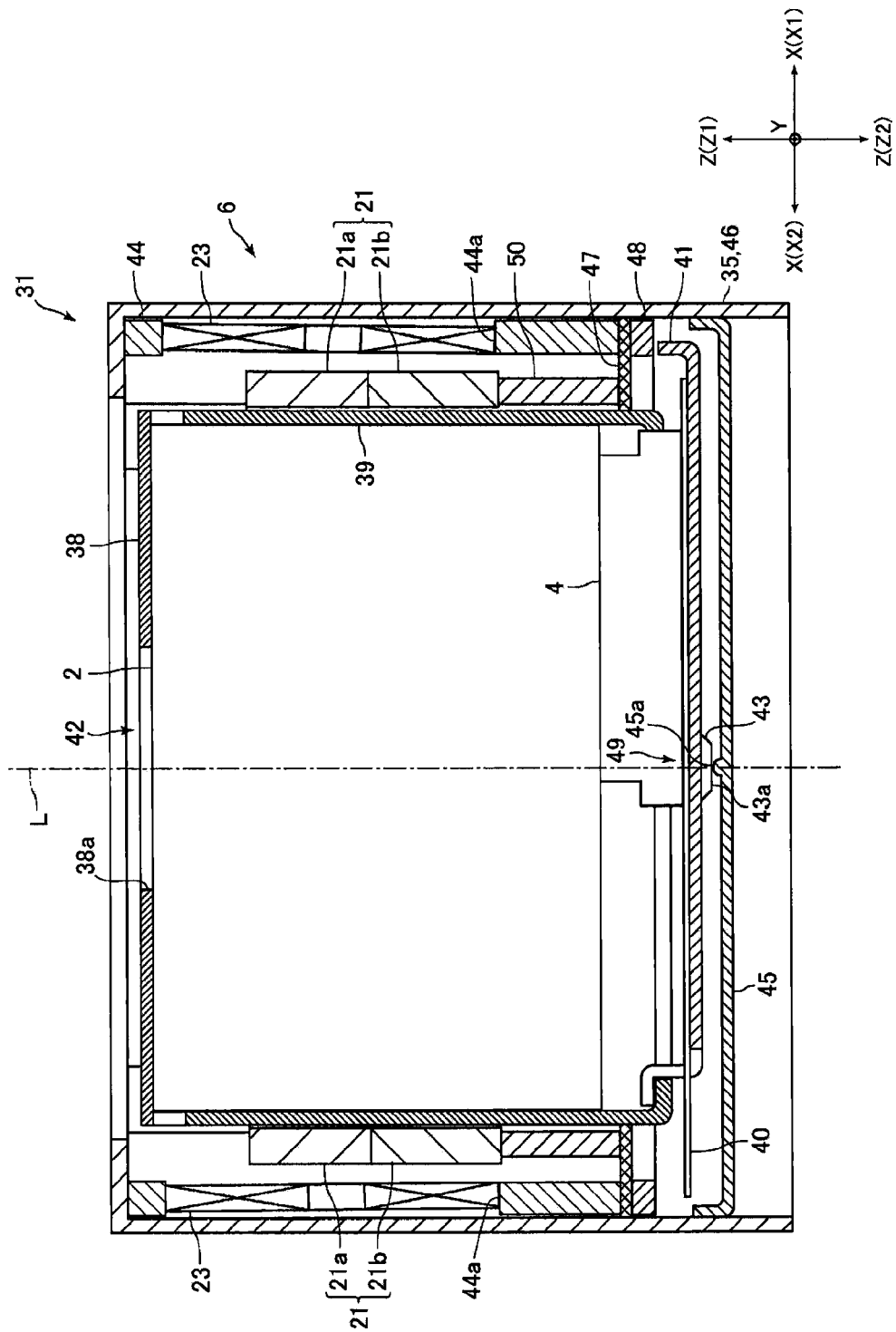
FIG. 6 is a cross-sectional view showing a photographic optical device in accordance with a second embodiment of the present invention.

FIG. 6 is a cross-sectional view showing a photographic optical device 31 in accordance with a second embodiment of the present invention. In the following description, the same reference signs are used in the same structures as the first embodiment and their descriptions are omitted or simplified. Further, similarly to the first embodiment, in the following description, three directions perpendicular to each other are set to be an "X" direction, a "Y" direction and a "Z" direction, and an "X1" direction side is referred to as a "right" side, an "X2" direction side is as a "left" side, a "Y1" direction side is as a "front" side, a "Y2" direction side is as a "rear" side, a "Z1" direction side is an "upper" side, and a "Z2" direction side is as a "lower" side.

A photographic optical device 31 in this embodiment is, similarly to the photographic optical device 1 in the first embodiment, a small and thin camera, which is mounted on a portable apparatus such as a cellular phone, and is generally formed in a substantially rectangular prism shape. The photographic optical device 31 is, as shown in FIG. 6, provided with the lens drive device 2, the sensor 4, the swing drive mechanism 6, and a support body 35 which supports the lens drive device 2. Similarly to the first embodiment, also in this embodiment, the up-and-down direction is coincided with a direction of an optical axis direction of the photographic optical device 31 when the lens drive device 2 is not swung.

Front and rear side faces and right and left side faces of the lens drive device 2 are covered by a cover member 39 which is formed in a substantially rectangular tube shape whose upper end and lower end are opened. The front and rear side faces and the right and left side faces of the cover member 39 are formed to be substantially parallel to the optical axis direction, and each of the side faces is fixed with the drive magnet 21. An upper end of the cover member 39 is attached with an upper cover member 38 which is formed in a substantially rectangular plate shape. A circular through hole 38a is formed at a center of the upper cover member 38.

The sensor 4 is disposed on a lower side of the lens drive device 2. Specifically, the sensor 4 is disposed on a lower side of the lens drive device 2 in a state that the optical axis "L" and the center of the sensor 4 are displaced from each other. An FPC 40 is connected with the sensor 4. Further, an under face side of the sensor 4 is covered by a lower cover member 41 which is formed in a substantially rectangular plate shape. The lower cover member 41 is attached to a lower end of the cover member 39 to cover the lower end side of the cover member 39. An under face of the lower cover member 41 is fixed with an abutting member 43 which is formed with an abutting face 43a formed in a flat-like face with which a supporting point protruded part 45a described below is abutted.

In this embodiment, the lens drive device 2, the sensor 4, the cover member 39, the upper cover member 38, the lower cover member 41, the abutting member 43 and a spring fixing member 50 described below are swingably supported by the support body 35. In other words, a movable module 42 which is capable of swinging with respect to the support body 35 is structured of the lens drive device 2, the sensor 4, the cover member 39, the upper cover member 38, the lower cover member 41, the abutting member 43 and the spring fixing member 50. The movable module 42 is formed so that its shape when viewed in the optical axis direction is a substantially rectangular shape. Specifically, the movable module 42 is formed so that its shape when viewed in the optical axis direction is a substantially square shape.

The support body 35 is provided with a base body 45 which structures an under face of the photographic optical device 31, a case body 46 which structures an outer peripheral face on the front and rear sides and the right and left sides of the photographic optical device 31, and a coil holding member 44 which holds the drive coils 23. A flat spring 47 as a spring member which swingably supports the movable module 42 is fixed to the coil holding member 44 or the case body 46.

The base body 45 is formed in a substantially rectangular flat plate shape. A substantially center of the base body 45 is formed with a supporting point protruded part 45a, which functions as a supporting point when the movable module 42 is swung, so as to protrude toward an upper side. In other words, in this embodiment, a supporting point for swing of the movable module 42 is disposed on a lower side of the movable module 42. The supporting point protruded part 45a is, for example, formed in a hemispherical face shape and abutted with an abutting face 43a of the abutting member 43. In this embodiment, a supporting point part 49 which is a swing center of the lens drive device 2 is structured by the supporting point protruded part 45a and the abutting face 43a. The supporting point part 49 is disposed at a position through which the optical axis "L" is passed. Further, in this embodiment, the optical axis "L" is passed through a substantially center position of the movable module 42.

The case body 46 is formed in a substantially rectangular tube shape whose upper end and lower end are opened. Side faces on the front and rear sides and on the right and left sides of the case body 46 are formed to be substantially parallel to the optical axis direction. A coil holding member 44 is, for example, formed of resin having an insulation property. Further, the coil holding member 44 is formed in a substantially rectangular tube shape having four side faces which are substantially parallel to the side faces of the case body 46. The coil holding member 44 is fixed to an inner peripheral face of the case body 46. Each of four side faces of the coil holding member 44 is formed with an arrangement hole 44a on which the drive coil 23 is disposed so as to penetrate through the side face of the coil holding member 44.

A flat spring 47 is formed in a substantially rectangular shape as a whole. Specifically, the flat spring 47 is formed in a substantially square shape as a whole. Further, the flat spring 47 is disposed so that its outer peripheral ends are substantially parallel to the right and left direction or the front and rear direction. An outer peripheral side of the flat spring 47 is fixed to a lower end side of the support body 35. Specifically, an outer peripheral side of the flat spring 47 is fixed to a spring fixing member 48 which is fixed to a lower end side of the coil holding member 44 or the case body 46. Further, the lower end side of the movable module 42 is fixed to a center part of the flat spring 47. Specifically, a spring fixing member 50 which is fixed to an outer peripheral face on the lower end side of the cover member 39 is fixed to a center part of the flat spring 47.

As shown in FIG. 6, the flat spring 47 is disposed in the vicinity of the supporting point part 49 which is a swing center of the movable module 42 in the optical axis direction. Specifically, the flat spring 47 is disposed on a slightly upper side with respect to the supporting point part 49 in the optical axis direction and disposed on a supporting point part 49 side with respect to the swing drive mechanism 6. A detailed structure of the flat spring 47 will be described below.

Similarly to the first embodiment, also in this embodiment, a drive force for swinging the movable module 42 with the front and rear direction as an axial direction of swing is generated by the drive magnets 21 and the drive coils 23 which are oppositely disposed in the right and left direction. (In other words, the movable module 42 is swung around the Y-axis.) Further, a drive force for swinging the movable module 42 with the right and left direction as an axial direction of swing is generated by the drive magnets 21 and the drive coils 23 which are oppositely disposed in the front and rear direction. (In other words, the movable module 42 is swung around the X-axis.)

In the photographic optical device 31 structured as described above, when a variation of inclination of the lens drive device 2 is detected with the sensor 4, an electric current is supplied to the drive coils 23 on the basis of a detection result of the sensor 4, and the movable module 42 is swung with the supporting point part 49 as a center and the shake is corrected. In this embodiment, the shake correction mechanism for correcting a shake in which the lens drive device 2 is swung on the basis of a detection result of the sensor 4 is structured by utilizing the supporting point part 49, the swing drive mechanism 6 and the flat spring 47.

(Structure of Flat Spring)

Figure 7:
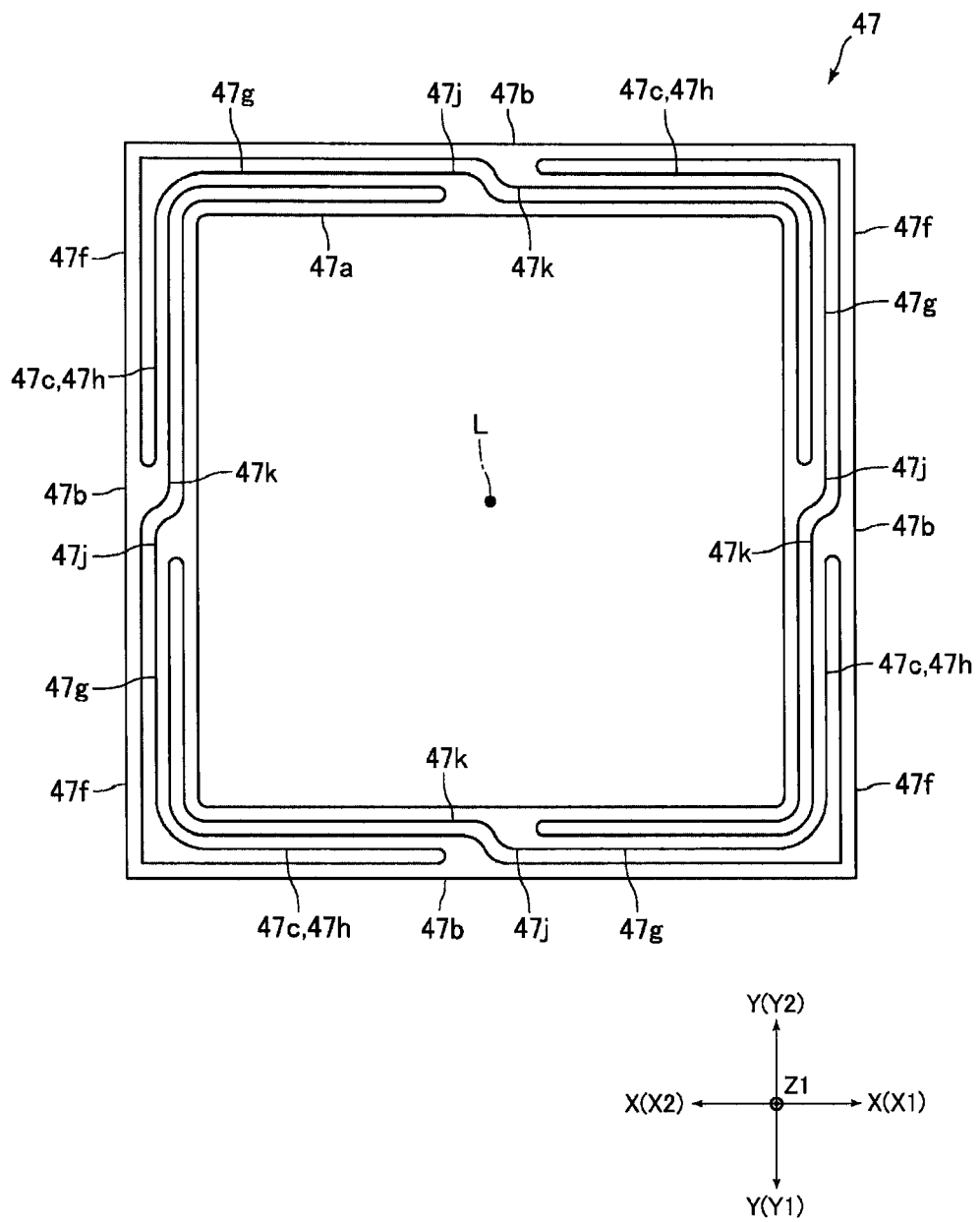
FIG. 7 is a plan view showing a flat spring in FIG. 6.

FIG. 7 is a plan view showing the flat spring 47 in FIG. 6.

The flat spring 47 is, as shown in FIG. 7, provided with a holding part 47a which holds the movable module 42, four fixing parts 47b which are fixed to the support body 35, and four spring parts 47c which connect the holding part 47a with the fixing parts 47b. The flat spring 47 is disposed so that the optical axis "L" is passed through its substantially center position. Further, similarly to the first embodiment, in this embodiment, a swing operation of the movable module 42 which is held by the holding part 47a can be performed by means of that the spring parts 47c are resiliently bent with respect to the fixing parts 47b.

The holding part 47a is formed in a substantially square frame shape. An upper face of the holding part 47a is, as shown in FIG. 6, fixed to an under face of the spring fixing member 50 which structures the movable module 42. The fixing parts 47b are disposed at substantially center in the right and left direction and at substantially center in the front and rear direction of the flat spring 47. An under face of the fixing part 47b is fixed to an upper face of the spring fixing member 48. In this embodiment, the entire outer peripheral frame of the flat spring 47 including connecting parts 47f described below is fixed to the upper face of the spring fixing member 48.

The spring part 47c is disposed on an outer peripheral side of the holding part 47a. The spring part 47c is formed in a substantially "L"-shape from substantially center positions in the right and left direction or in the front and rear directions of the holding part 47a toward the fixing parts 47b. Specifically, the spring part 47c is formed in a substantially "L"-shape which is structured of a straight line-shaped holding part side spring part 47g that is connected with the holding part 47a and a straight line-shaped fixing part side spring part 47h that is connected with the fixing part 47b.

More specifically, a first spring part 47c is structured of the holding part side spring part 47g, which is formed from a substantially center in the front and rear direction at the right end of the holding part 47a to the rear direction, and the fixing part side spring part 47h which is formed from the rear end of the holding part side spring part 47g to the left direction and connected with the fixing part 47b that is disposed on the rear side and a substantially center in the right and left direction of the flat spring 47. Further, a second spring part 47c is structured of the holding part side spring part 47g, which is formed from a substantially center in the right and left direction at the rear end of the holding part 47a to the left direction, and the fixing part side spring part 47h which is formed from the left end of the holding part side spring part 47g to the front direction and connected with the fixing part 47b that is disposed on the left side and a substantially center in the front and rear direction of the flat spring 47. In addition, a third spring part 47c is structured of the holding part side spring part 47g, which is formed from a substantially center in the front and rear direction at the left end of the holding part 47a to the front direction, and the fixing part side spring part 47h which is formed from the front end of the holding part side spring part 47g to the right direction and connected with the fixing part 47b that is disposed on the front side and a substantially center in the right and left direction of the flat spring 47. Further, a fourth spring part 47c is structured of the holding part side spring part 47g, which is formed from a substantially center in the right and left direction at the front end of the holding part 47a to the right direction, and the fixing part side spring part 47h which is formed from the right end of the holding part side spring part 47g to the rear direction and connected with the fixing part 47b that is disposed on the right side and a substantially center in the front and rear direction of the flat spring 47.

In other words, the flat spring 47 is provided with two spring parts 47c, which are formed from substantially centers in the right and left direction of the holding part 47a toward the fixing parts 47b that are disposed at substantially centers in the front and rear direction, and two spring parts 47c which are formed from substantially centers in the front and rear direction of the holding part 47a toward the fixing parts 47b that are disposed at substantially centers in the right and left direction. Specifically, the flat spring 47 is provided with two spring parts 47c, which are formed from substantially centers in the right and left direction of the holding part 47a toward the fixing parts 47b that are adjacent in the counterclockwise direction in FIG. 7 and disposed at substantially centers in the front and rear direction, and two spring parts 47c, which are formed from substantially centers in the front and rear direction of the holding part 47a toward the fixing parts 47b that are adjacent in the counterclockwise direction in FIG. 7 and disposed at substantially centers in the right and left direction.

Further, a holding part side end 47j of the first spring part 47c and a fixing part side end 47k of the fourth spring part 47c are adjacent to each other in the front and rear direction. Similarly, a holding part side end 47j of the second spring part 47c and a fixing part side end 47k of the first spring part 47c are adjacent to each other in the right and left direction, a holding part side end 47j of the third spring part 47c and a fixing part side end 47k of the second spring part 47c are adjacent to each other in the front and rear direction, and a holding part side end 47j of the fourth spring part 47c and a fixing part side end 47k of the third spring part 47c are adjacent to each other in the right and left direction.

In other words, the holding part side end 47j of the spring part 47c, which is formed from the substantially center of the holding part 47a in the right and left direction toward the fixing part 47b that is disposed at the substantially center in the front and rear direction, and the fixing part side end 47k of the spring part 47c which is formed from the substantially center of the holding part 47a in the front and rear direction toward the fixing part 47b that is disposed at the substantially center in the right and left direction are adjacent to each other in the right and left direction. Further, the holding part side end 47j of the spring part 47c, which is formed from the substantially center of the holding part 47a in the front and rear direction toward the fixing part 47b that is disposed at the substantially center in the right and left direction, and the fixing part side end 47k of the spring part 47c which is formed from the substantially center of the holding part 47a in the right and left direction toward the fixing part 47b that is disposed at the substantially center in the front and rear direction are adjacent to each other in the front and rear direction.

Similarly to the flat spring 17 in the first embodiment, four spring parts 47c of the flat spring 47 are disposed in a substantially point symmetrical manner with respect to the optical axis "L" passing through the center of the holding part 47a. Further, in this embodiment, the holding part side spring part 47g and the fixing part side spring part 47h which are substantially parallel to the right and left direction are the first spring part, and the holding part side spring part 47g and the fixing part side spring part 47h which are substantially parallel to the front and rear direction are the second spring part. Further, as shown in FIG. 7, the fixing parts 47b of the flat spring 47 which are adjacent to each other in the circumferential direction are connected with each other through the connecting part 47f that is formed in a substantially by "L"-shape.

As described above, the upper face of the holding part 47a is fixed to the under face of the spring fixing member 50 which is fixed to the outer peripheral face of the cover member 39. Further, the spring part 47c is disposed between the outer peripheral frame of the flat spring 47, which is structured of the fixing part 47b and the connecting part 47f, and the holding part 47a. In other words, in this embodiment, the holding part side spring part 47g and the fixing part side spring part 47h are disposed between the outer peripheral face of the movable module 42 and the outer peripheral ends of the flat spring 47.

In this embodiment, a spring constant of the spring part 47c in the optical axis direction is set to be not more than a spring constant of the spring part 47c in the right and left direction and a spring constant of the spring part 47c in the front and rear direction. Specifically, the spring part 47c is formed so that its thickness is not more than its width. For example, the thickness of the spring part 47c is 0.15 mm, and the width of the spring part 47c is 0.21 mm or 0.15 mm. Further, the flat spring 47 is fixed to the support body 35 in a resiliently bent state for generating pressurization so that the supporting point protruded part 45a and the abutting face 43a are surely abutted with each other.

Principal Effects in this Embodiment

Substantially similar effects to the first embodiment are obtained in the photographic optical device 31 which is structured as described above. Further, in this embodiment, the holding part side spring part 47g and the fixing part side spring part 47h are not superposed on each other in the right and left direction or the front and rear direction. Therefore, while the flat spring 47 is made smaller in the right and left direction and the front and rear direction, a length of the spring part 47c can be made relatively longer. Especially, in this embodiment, the holding part side end 47j of one of the spring parts 47c and the fixing part side end 47k of another of the spring parts 47c which are adjacent to each other in the circumferential direction of the flat spring 47 are adjacent to each other in the right and left direction or the front and rear direction and thus, the holding part side end 47j and the fixing part side end 47k are not superposed on each other in the right and left direction or the front and rear direction. Therefore, while the flat spring 47 is further made smaller in the right and left direction and the front and rear direction, a length of the spring part 47c can be made relatively longer.

Therefore, in this embodiment, while the flat spring 47 is made smaller in the right and left direction and the front and rear direction, the spring constant of the flat spring 47 can be made relatively small. As a result, in this embodiment, while the flat spring 47 is made smaller in the right and left direction and the front and rear direction, the movable module 47 can be swung smoothly.

In this embodiment, the holding part side spring part 47g and the fixing part side spring part 47h which are substantially parallel to the right and left direction or the front and rear direction are disposed between the outer peripheral face of the movable module 42 which are substantially parallel to the right and left direction or the front and rear direction and the outer peripheral end of the flat spring 47. Therefore, even when a space between the outer peripheral face of the movable module 42 and the outer peripheral end of the flat spring 47 (specifically, a space between the outer peripheral face of the cover member 39 and the outer peripheral end of the flat spring 47) is narrow, the holding part side spring part 47g and the fixing part side spring part 47h can be disposed appropriately. Accordingly, the photographic optical device 31 can be made smaller in the right and left direction and the front and rear direction.

In this embodiment, the flat spring 47 is disposed in the vicinity of the supporting point part 49 in the optical axis direction which is the swing center of the movable module 42. Therefore, in comparison with the spring part 17c of the flat spring 17 in the first embodiment, a deformed amount of the spring part 47c in the right and left direction and the front and rear direction can be reduced. Accordingly, in comparison with the spring part 17c of the flat spring 17, the spring part 47c of the flat spring 47 can be made shorter and thus the size of the flat spring 47 can be reduced.

In this embodiment, a spring constant of the spring part 47c in the optical axis direction is set to be smaller than a spring constant of the spring part 47c in the right and left direction and than a spring constant of the spring part 47c in the front and rear direction. Therefore, even when vibration having components in the front and rear direction and/or the right and left direction is applied to the photographic optical device 31 from the outside, the vibration of the movable module 42 can be restrained.

Third Embodiment

Figure 8:
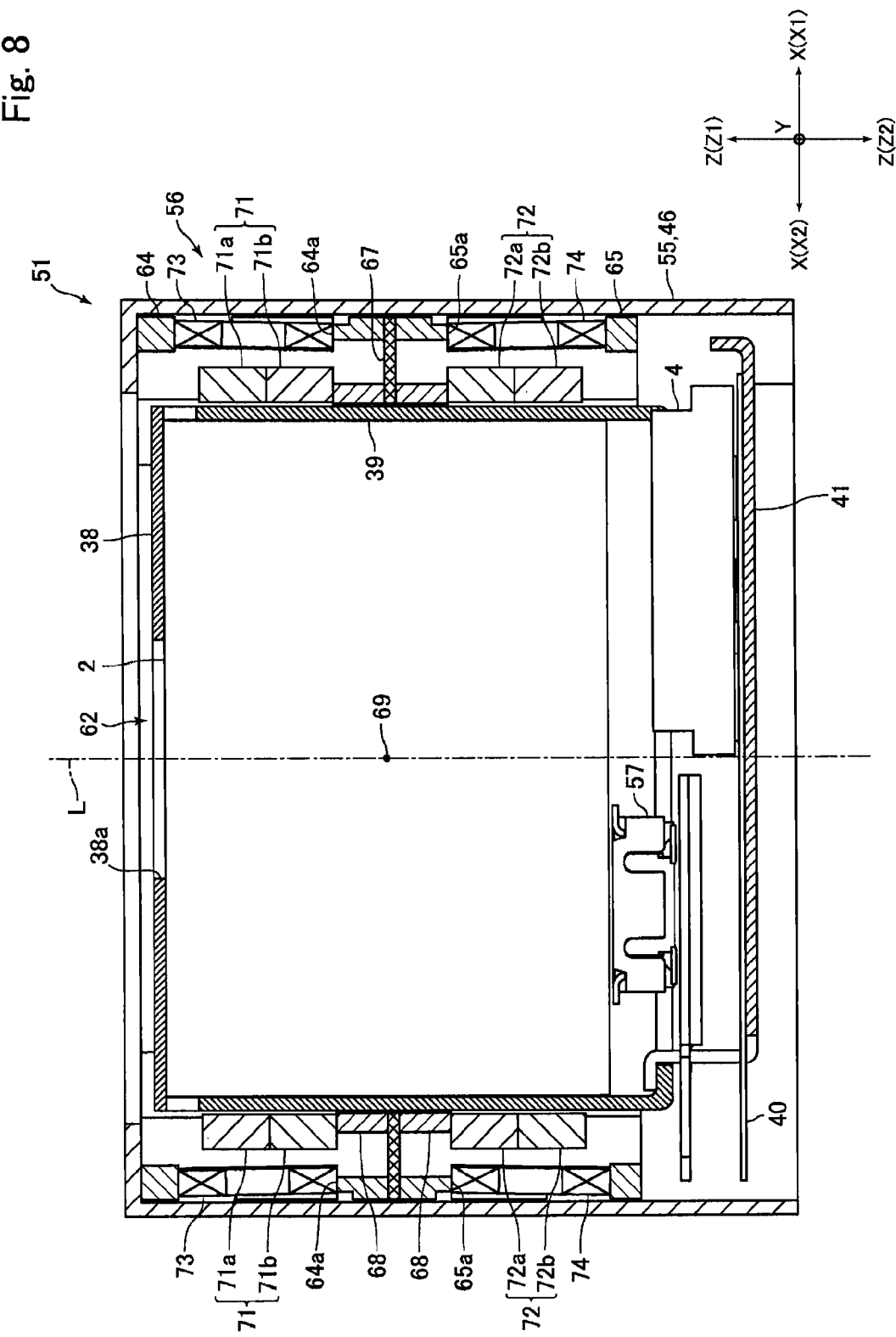
FIG. 8 is a cross-sectional view showing a photographic optical device in accordance with a third embodiment of the present invention.
Figure 9:
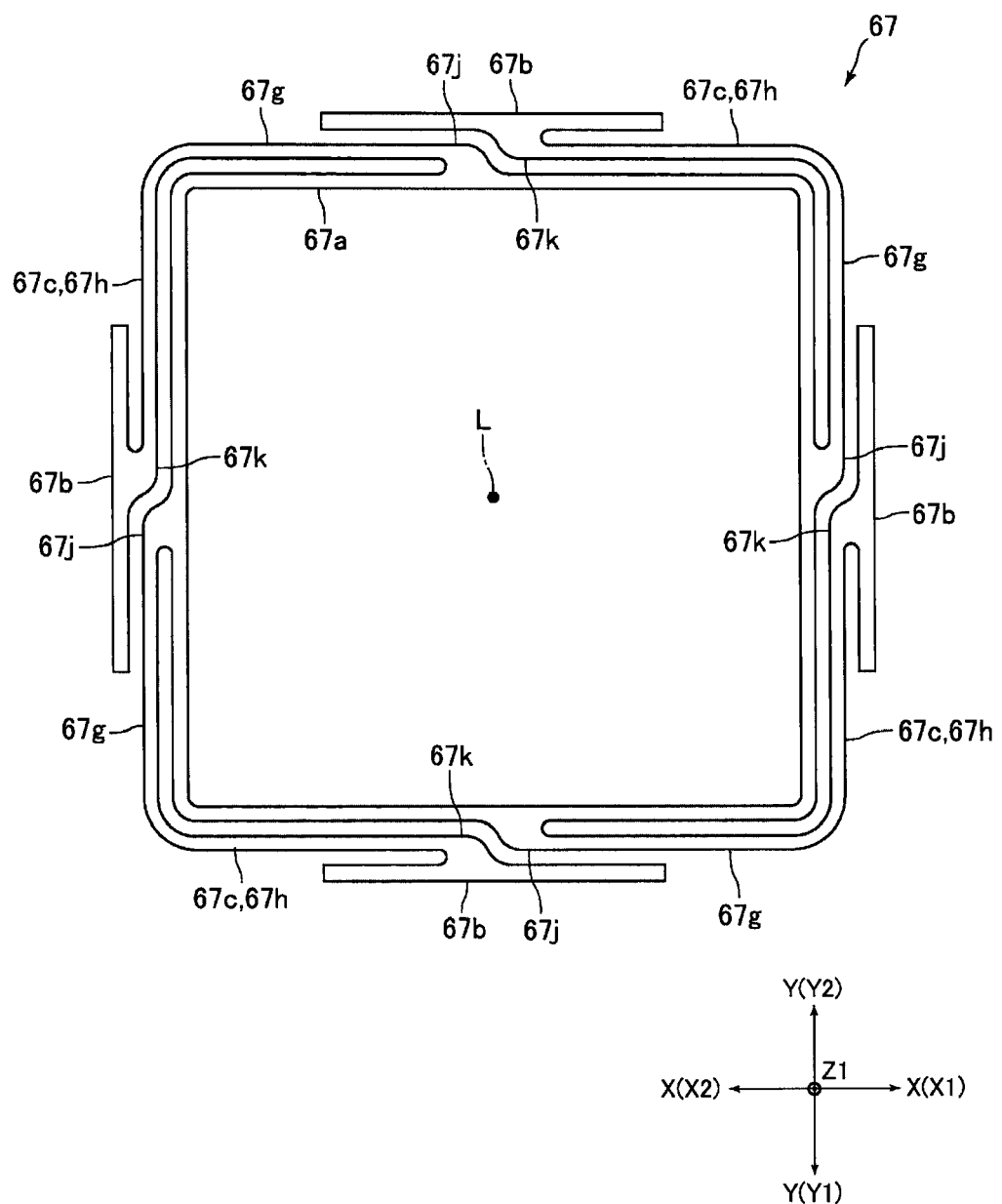
FIG. 9 is a plan view showing a flat spring in FIG. 8.

FIG. 8 is a cross-sectional view showing a photographic optical device 51 in accordance with a third embodiment of the present invention. FIG. 9 is a plan view showing a flat spring 67 in FIG. 8. In the following description, the same reference signs are used in the same structures as the first embodiment and the second embodiment and their descriptions are omitted or simplified. Further, similarly to the first embodiment and the second embodiment, in the following description, three directions perpendicular to each other are set to be an "X" direction, a "Y" direction and a "Z" direction, and an "X1" direction side is referred to as a "right" side, an "X2" direction side is as a "left" side, a "Y1" direction side is as a "front" side, a "Y2" direction side is as a "rear" side, a "Z1" direction side is an "upper" side, and a "Z2" direction side is as a "lower" side.

A photographic optical device 51 in this embodiment is, similarly to the photographic optical devices 1 and 31 described above, a small and thin camera, which is mounted on a portable apparatus such as a cellular phone, and is generally formed in a substantially rectangular prism shape. The photographic optical device 51 is, as shown in FIG. 8, provided with the lens drive device 2, the sensor 4, a support body 55 which supports the lens drive device 2, and a swing drive mechanism 56 for swinging the lens drive device 2. Also in this embodiment, the up-and-down direction is coincided with a direction of an optical axis direction of the photographic optical device 51 when the lens drive device 2 is not swung.

Front and rear side faces and right and left side faces of the lens drive device 2 are covered by a cover member 39. Four side faces of the cover member 39 are fixed with drive magnets 71 and 72 described below which structure the swing drive mechanism 56. An upper cover member 38 is attached to an upper end of the cover member 39.

The sensor 4 is disposed on a lower side of the lens drive device 2. Specifically, the sensor 4 is disposed on a lower side of the lens drive device 2 so that the sensor 4 is displaced from the optical axis "L". An FPC 40 is connected with the sensor 4. In this embodiment, an under face of the lens drive device 2 is disposed with a connector 57, which is electrically connected with an imaging element and the like that are mounted on the lens drive device 2, so as to be adjacent to the sensor 4. Further, an under face side of the sensor 4 is covered by a lower cover member 41.

In this embodiment, the lens drive device 2, the sensor 4, the cover member 39, the upper cover member 38 and the lower cover member 41 are swingably supported by the support body 55. In other words, the movable module 62 which is capable of swinging with respect to the support body 55 is structured of the lens drive device 2, the sensor 4, the cover member 39, the upper cover member 38 and the lower cover member 41. The movable module 62 is formed so that its shape when viewed in the optical axis direction is a substantially rectangular shape. Specifically, the movable module 62 is formed so that its shape when viewed in the optical axis direction is a substantially square shape.

The support body 55 is provided with a case body 46, which structures outer peripheral faces on the front and rear sides and the right and left sides of the photographic optical device 51, and coil holding members 64 and 65 which hold drive coils 73 and 74 described below structuring the swing drive mechanism 56. The flat spring 67 as a spring member which swingably supports the movable module 62 is fixed to the coil holding members 64 and 65 or the case body 46.

The coil holding members 64 and 65 are, for example, formed of resin having an insulation property. Further, the coil holding members 64 and 65 are formed in a substantially rectangular tube shape having four side faces which are substantially parallel to the side faces of the case body 46. The coil holding members 64 and 65 are fixed to an inner peripheral face of the case body 46. Specifically, the coil holding members 64 and 65 are fixed to the inner peripheral face of the case body 46 so as to be superposed on each other in the optical axis direction. Further, the coil holding member 64 is disposed on the upper side and the coil holding member 65 is disposed on the lower side.

Each of four side faces of the coil holding member 64 is formed with an arrangement hole 64a, on which a drive coil 73 described later is disposed, so as to penetrate through the side face of the coil holding member 64. Further, each of four side faces of the coil holding member 65 is formed with an arrangement hole 65a, on which a drive coil 74 described later is disposed, so as to penetrate through the side face of the coil holding member 65.

A flat spring 67 is formed in a substantially rectangular shape as a whole. Further, the flat spring 67 is disposed so that its outer peripheral end is substantially parallel to the right and left direction or the front and rear direction. An outer peripheral side of the flat spring 67 is fixed to the support body 55 and the movable module 62 is fixed to a center part of the flat spring 67.

In this embodiment, a substantially center position of the cover member 39 in the optical axis direction is fixed to the center part of the flat spring 67. Specifically, the substantially center position of the cover member 39 in the optical axis direction is fixed to the center part of the flat spring 67 through a spacer 68 fixed to the substantially center position of the cover member 39 in the optical axis direction. Therefore, the flat spring 67 is disposed at an intermediate position of the movable module 62 in the optical axis direction. In this embodiment, the substantially center position of the flat spring 67 is a swing center 69 of the movable module 62. The swing center 69 is disposed at a position through which the optical axis "L" of the lens drive device 2 is passed. In this embodiment, the optical axis "L" of the lens drive device 2 is disposed at the center of the movable module 62.

The flat spring 67 is, as shown in FIG. 9, formed to be similar to the flat spring 47 except that fixing parts 67b adjacent to each other in a circumferential direction of the flat spring 67 are not connected with each other. In other words, each of a holding part 67a, a fixing part 67b, a spring part 67c, a holding part side spring part 67g, a fixing part side spring part 67h, a holding part side end 67j and a fixing part side end 67k of the flat spring 67 is structured substantially similar to each of the holding part 47a, the fixing part 47b, the spring part 47c, the holding part side spring part 47g, the fixing part side spring part 47h, the holding part side end 47j and the fixing part side end 47k of the flat spring 47. Therefore, detailed description of the flat spring 67 is omitted.

The swing drive mechanism 56 is provided with drive magnets 71 disposed on an upper side with respect to the swing center 69 in the optical axis direction, drive coils 73 oppositely disposed to the drive magnets 71, drive magnets 72 disposed on a lower side with respect to the swing center 69 in the optical axis direction, and drive coils 74 oppositely disposed to the drive magnets 72. The swing drive mechanism 56 in this embodiment is provided with four drive magnets 71, four drive magnets 72, four drive coils 73 and four drive coils 74.

The drive magnets 71 and 72 are formed to be similar to the drive magnet 21. In other words, the drive magnet 71 is structured of a first magnet piece 71a and a second magnet piece 71b which are abutted with each other in the optical axis direction, and the drive magnet 72 is structured of a first magnet piece 72a and a second magnet piece 72b which are abutted with each other in the optical axis direction.

The drive magnets 71 and 72 are fixed to each of the front and rear side faces and the right and left side faces of the cover member 39 by one piece. Specifically, one piece of the drive magnet 71 is fixed to each of the front and rear side faces and the right and left side faces of the cover member 39 on the upper side with respect to the flat spring 67, and one piece of the drive magnet 72 is fixed to each of the front and rear side faces and the right and left side faces of the cover member 39 on the lower side with respect to the flat spring 67. In this embodiment, the drive magnets 71 and 72 are fixed to the side face of the cover member 39 through the spacers 68, which are formed in a substantially rectangular frame shape, in a positioned state in the optical axis direction.

Similarly to the first embodiment, in this embodiment, the drive magnets 71 and 72 fixed to the right and left side faces of the cover member 39 are magnetized so that magnetic poles formed on the right side faces of the drive magnets 71 and 72 and magnetic poles formed on their left side faces are different from each other. Further, the drive magnets 71 and 72 fixed to the right and left side faces of the cover member 39 are magnetized so that magnetic poles formed on outer side faces of first magnet pieces 71a and 72a in the right and left direction and magnetic poles formed on outer side faces of second magnet pieces 71b and 72b are different from each other.

Similarly, the drive magnets 71 and 72 fixed to the front and rear side faces of the cover member 39 are magnetized so that magnetic poles formed on the front side faces of the drive magnets 71 and 72 and magnetic poles formed on their rear side faces are different from each other. Further, the drive magnets 71 and 72 fixed to the front and rear side faces of the cover member 39 are magnetized so that magnetic poles formed on outer side faces of first magnet pieces 71a and 72a in the front and rear direction and magnetic poles formed on outer side faces of second magnet pieces 71b and 72b are different from each other.

The drive coils 73 and 74 are an air-core coil which is similar to the drive coil 23. The drive coil 73 is fixed by one piece to each of front and rear side faces and right and left side faces of the coil holding member 64. Further, the drive coil 74 is fixed by one piece to each of front and rear side faces and right and left side faces of the coil holding member 65.

As shown in FIG. 8, the drive magnet 71 and the drive coil 73 are oppositely disposed to each other through a predetermined gap space. Specifically, even when the movable module 62 is swung with the swing center 69 as a center, the drive magnet 71 and the drive coil 73 are oppositely disposed to each other through a predetermined gap space so that the drive magnet 71 and the drive coil 73 are not abutted with each other. Similarly, even when the movable module 62 is swung with the swing center 69 as a center, the drive magnet 72 and the drive coil 74 are oppositely disposed to each other through a predetermined gap space so that the drive magnet 72 and the drive coil 74 are not abutted with each other. In this embodiment, when an electric current is not supplied to the drive coils 73 and 74, as shown in FIG. 8, the movable module 62 is located at a neutral position where the movable module 62 is not inclined with respect to the support body 55.

In the photographic optical device 51 which is structured as described above, when a variation of inclination of the lens drive device 2 is detected by the sensor 4, an electric current is supplied to the drive coils 73 and 74 on the basis of a detection result of the sensor 4 and the movable module 62 is swung with the swing center 69 as a center to correct the shake. In this embodiment, a shake correction mechanism which swings the lens drive device 2 on the basis of a detection result of the sensor 4 for correcting a shake is structured of the swing drive mechanism 56 and the flat spring 67.

The photographic optical device 51 structured as described above is capable of obtaining similar effects to the photographic optical device 31 in the second embodiment.

Modified Embodiments of Flat Spring

Figure 10:
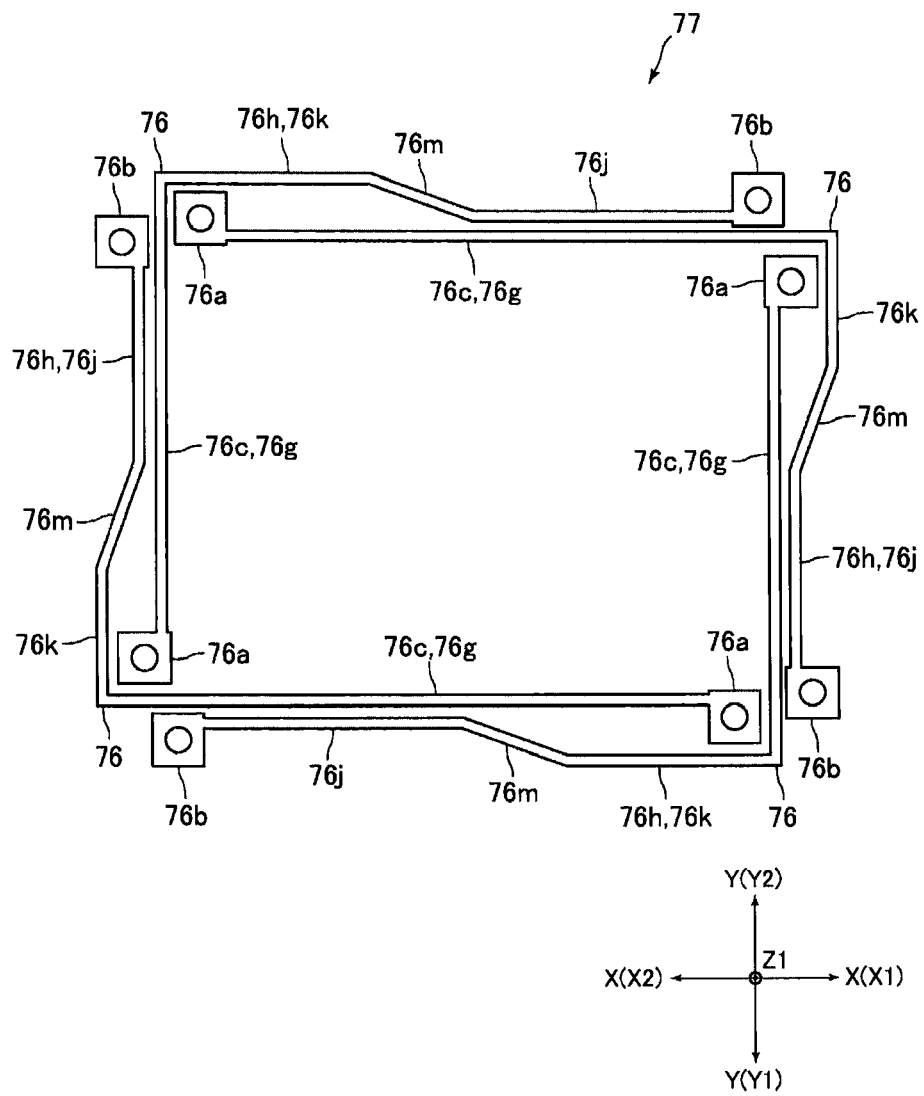
FIG. 10 is a plan view showing a flat spring in accordance with another embodiment of the present invention.
Figure 11:
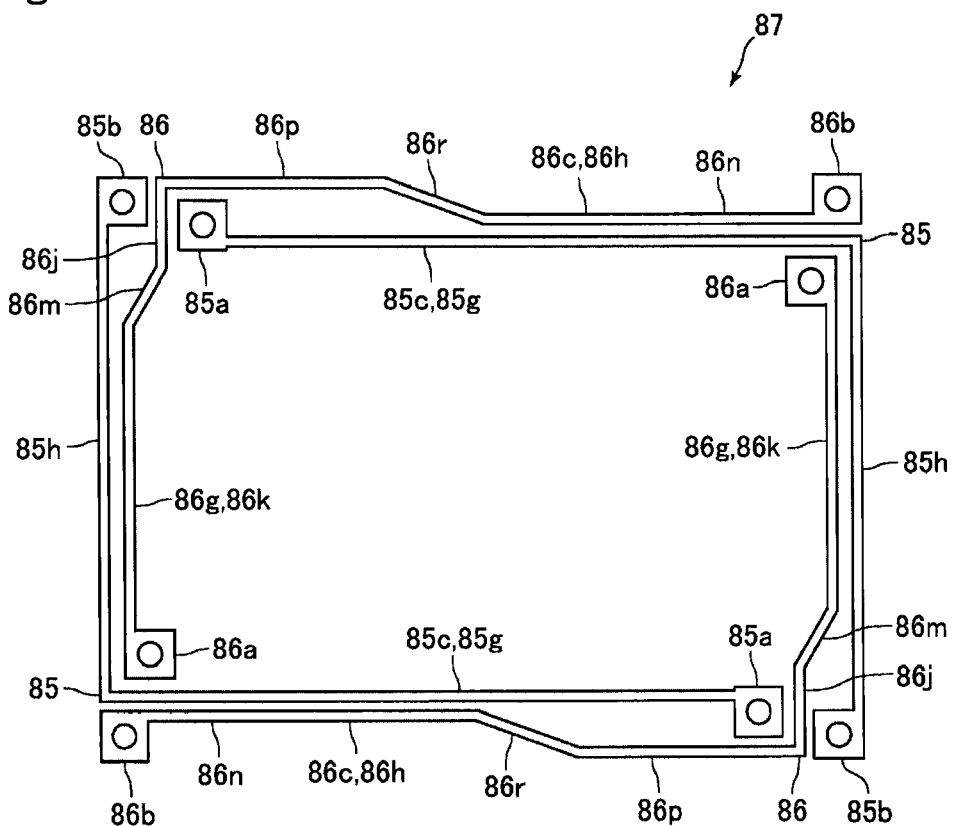
FIG. 11 is a plan view showing a flat spring in accordance with another embodiment of the present invention.
Figure 11:
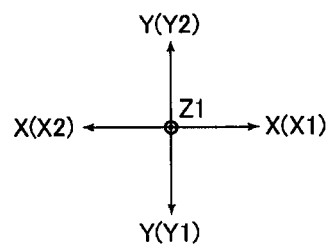
Figure 12:
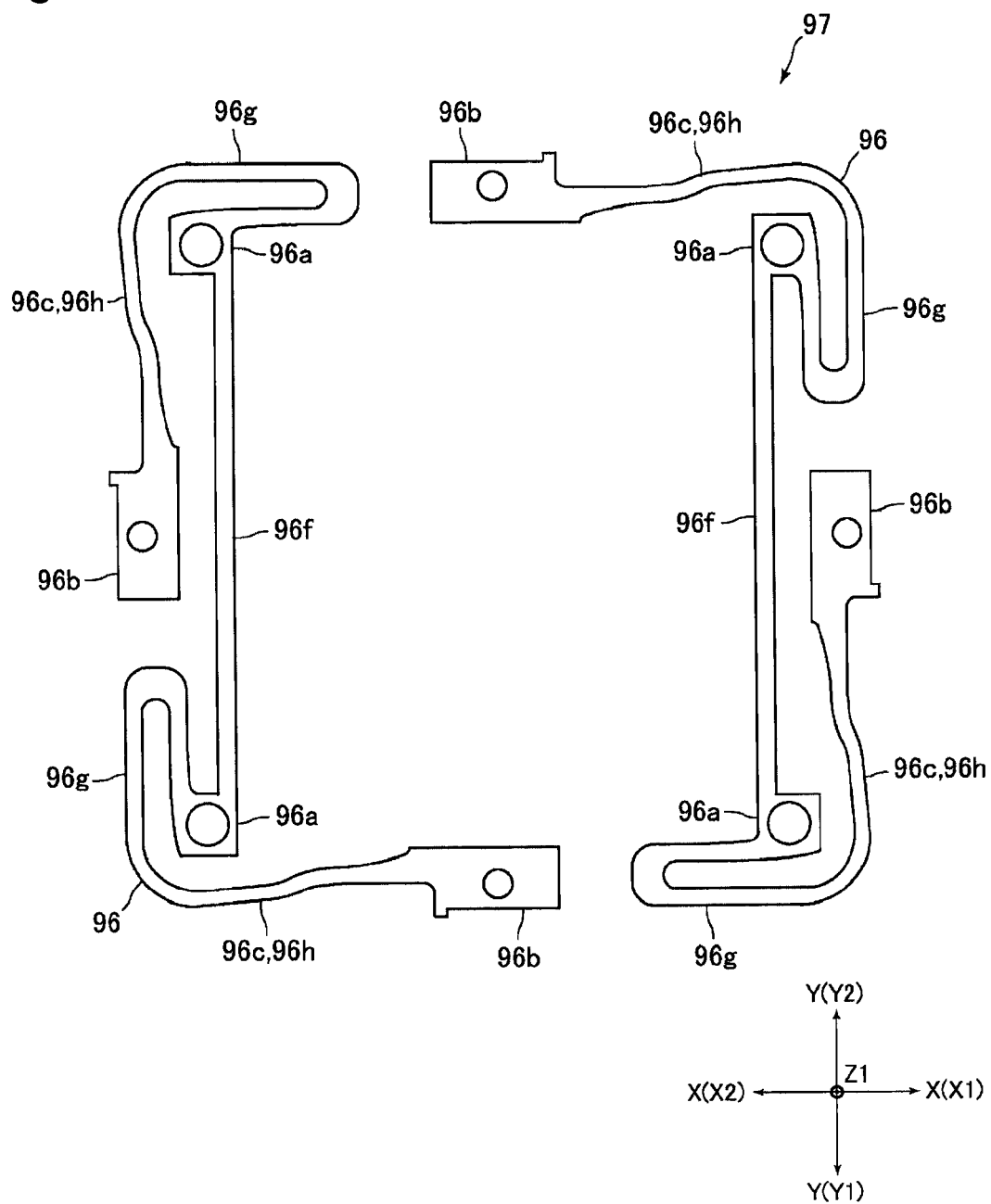
FIG. 12 is a plan view showing a flat spring in accordance with another embodiment of the present invention.

In the embodiments described above, the flat springs 17, 47 and 67 are formed in an integral manner. However, the present invention is not limited to this embodiment. For example, as shown in FIGS. 10 through 12, flat springs 77, 87 and 97 may be structured of a plurality of spring pieces 76, 85, 86 and 96. Structures of the flat springs 77, 87 and 97 will be described below in this order in which the flat spring 77 as a "first modified embodiment of the flat spring", the flat spring 87 as a "second modified embodiment of the flat spring" and the flat spring 97 as a "third modified embodiment of the flat spring". Further, other modified embodiments of the flat spring will be also described below.

First Modified Embodiment of Flat Spring

As shown in FIG. 10, the flat spring 77 is formed in a substantially quadrangular shape as a whole. Specifically, the flat spring 77 is formed in a substantially rectangular shape as a whole. Further, the flat spring 77 is structured of four spring pieces 76 which are formed in a substantially "L"-shape. Each of four spring pieces 76 is provided with one holding part 76*a* which holds the movable modules 12, 42 and 62, one fixing part 76*b* which is fixed to the support bodies 5, 35 and 55, and one spring part 76*c* which connects the holding part 76*a* with the fixing part 76*b*.

The holding part 76*a* is formed in a substantially square shape. The movable modules 12, 42 and 62 are fixed to the holding part 76*a*. Specifically, the holding part 76*a* is fixed to four corners or the vicinities of four corners of the movable modules 12, 42 and 62 when viewed in the optical axis direction. The fixing part 76*b* is formed in a substantially square shape and disposed at four corners of the flat spring 77. Further, the fixing part 76*b* is disposed at four corners or in the vicinities of four corners of inner peripheral faces of the case bodies 16 and 46.

The spring part 76*c* is formed in a substantially "L"-shape which is structured of the holding part side spring part 76*g* connected with the holding part 76*a* and the fixing part side spring part 76*h* connected with the fixing part 76*b*. In other words, the spring part 76*c* is formed in a substantially "L"-shape which is structured so that the holding part 76*a* and the fixing part 76*b* disposed on a substantially diagonal line of the flat spring 77 (substantially diagonal line of the photographic optical devices 1, 31 and 51) are connected with each other.

As shown in FIG. 10, the holding part side spring part 76*g* is formed in a straight line shape. Further, the fixing part side spring part 76*h* is formed in a polygonal line shape so as to avoid the holding part 76*a* and the like. Specifically, the fixing part side spring part 76*h* in a polygonal line shape is structured of two straight line parts 76*j* and 76*k*, which are disposed to be substantially parallel to the right and left direction or the front and rear direction, and one slanted line part 76*m* which is disposed to incline with respect to the right and left direction and the front and rear direction and which connects two straight line parts 76*j* and 76*k* with each other. In the embodiment shown in FIG. 10, the straight line part 76*j* is disposed on an inner side in the right and left direction or the front and rear direction and connected with the fixing part 76*b*. Further, the straight line part 76*k* is disposed on an outer side in the right and left direction or the front and rear direction and connected with the holding part side spring part 76*g*.

Further, as shown in FIG. 10, four spring pieces 76 are disposed in a substantially point-symmetrical manner with respect to the center of the flat spring 77 when viewed in the optical axis direction. Further, four spring pieces 76 are disposed so that the holding part side spring part 76*g* of one spring part 76*c* and the fixing part side spring part 76*h* of another spring part 76*c* are superposed on each other in the right and left direction or the front and rear direction. In the flat spring 77, the holding part side spring part 76*g* and the fixing part side spring part 76*h* which are substantially parallel to the right and left direction are a first spring part, and the holding part side spring part 76*g* and the fixing part side spring part 76*h* which are substantially parallel to the front and rear direction are a second spring part. In the embodiment shown in FIG. 10, similarly to the flat spring 47, the holding part side spring part 76*g* and the fixing part side spring part 76*h* are disposed between the outer peripheral faces of the movable modules 12, 42 and 62 and the outer peripheral end of the flat spring 77.

In the flat spring 77 structured as described above, the spring part 76*c* is formed in a substantially "L"-shape which is structured so that the holding part 76*a* and the fixing part 76*b* which are disposed on a substantially diagonal line of the photographic optical devices 1, 31 and 51 are connected with each other and thus, a length of the spring part 76*c* can be made longer. Therefore, a spring constant of the flat spring 77 can be made smaller and the movable modules 12, 42 and 62 can be swung smoothly. Further, a stress applied to the spring part 76*c* can be dispersed and a stable elasticity can be obtained.

Further, in the flat spring 77, two straight line parts 76*j* and 76*k* are connected with each other through the slanted line part 76*m*. Therefore, in comparison with a case that the fixing part side spring part 76*h* is formed in a straight line shape, a length of the fixing part side spring part 76*h* can be made longer. Further, two straight line parts 76*j* and 76*k* are connected with each other through the slanted line part 76*m* and thus stress concentration of bending stress in a connected portion of the straight line part 76*j* with the straight line part 76*k* can be reduced. Therefore, plastic deformation of the fixing part side spring part 76*h* can be prevented.

Further, in the flat spring 77, as shown in FIG. 10, a space is formed between the straight line part 76*k*, the slanted line part 76*m* and the holding part side spring part 76*g* in the right and left direction or the front and rear direction. Therefore, another component for the photographic optical devices 1, 31 and 51 can be disposed in the space.

Second Modified Embodiment of Flat Spring

The flat spring 77 shown in FIG. 10 is structured of four spring pieces 76 which are formed in the same shape as each other. However, as shown in FIG. 11, a flat spring 87 may be structured of two types of spring pieces 85 and 86 whose shapes are different from each other, in other words, the shape of two spring pieces 85 is different from the shape of two spring pieces 86.

Each of two spring pieces 85 is provided with one holding part 85*a* which holds the movable modules 12, 42 and 62, one fixing part 85*b* which is fixed to the support bodies 5, 35 and 55, and one spring part 85*c* which connects the holding part 85*a* with the fixing part 85*b*. Further, each of two spring pieces 86 is provided with one holding part 86*a* which holds the movable modules 12, 42 and 62, one fixing part 86*b* which is fixed to the support bodies 5, 35 and 55, and one spring part 86*c* which connects the holding part 86*a* with the fixing part 86*b*.

The holding parts 85*a* and 86*a* are formed in a substantially square shape. The holding parts 85*a* and 86*a* are fixed to four corners or vicinities of four corners of the movable modules 12, 42 and 62 when viewed in the optical axis direction. Further, two holding parts 85*a* are disposed on a substantially diagonal line of the movable modules 12, 42 and 62, and two holding parts 86*a* are disposed on a substantially diagonal line of the movable module 12, 42 and 62.

The fixing parts 85*b* and 86*b* are formed in a substantially square shape and disposed at four corners of the flat spring 87. Further, the fixing parts 85*b* and 86*b* are disposed at four corners or vicinities of four corners on inner peripheral faces of the case bodies 16 and 46. Further, two fixing parts 85*b* are disposed on a diagonal line of the inner peripheral faces of the case bodies 16 and 46, and two fixing parts 86*b* are disposed on a diagonal line of the inner peripheral faces of the case bodies 16 and 46.

The spring part 85*c* is formed in a substantially "L"-shape which is structured of a holding part side spring part 85*g*, which is formed in a straight line shape and connected with the holding part 85*a*, and a fixing part side spring part 85*h* which is formed in a straight line shape and connected with the fixing part 85*b*. In other words, the spring part 85*c* is formed in a substantially "L"-shape which is structured so that the holding part 85*a* and the fixing part 85*b* disposed on a substantially diagonal line of the flat spring 87 (substantially diagonal line of the photographic optical devices 1, 31 and 51) are connected with each other.

The spring part 86*c* is formed in a substantially "L"-shape which is structured of a holding part side spring part 86*g*, which is formed in a polygonal line shape and connected with the holding part 86*a*, and a fixing part side spring part 86*h* which is formed in a polygonal line shape and connected with the fixing part 86*b*. In other words, the spring part 86*c* is formed in a substantially "L"-shape which is structured so that the holding part 86*a* and the fixing part 86*b* disposed on a substantially diagonal line of the flat spring 87 (substantially diagonal line of the photographic optical devices 1, 31 and 51) are connected with each other.

The holding part side spring part 86*g* and the fixing part side spring part 86*h* are formed in a polygonal line shape so as to avoid the holding part 85*a*, the fixing part 85*b* and the like. Specifically, the holding part side spring part 86*g* is structured of two straight line parts 86*j* and 86*k*, which are disposed to be substantially parallel to the front and rear direction, and one slanted line part 86*m* which is disposed to incline with respect to the front and rear direction and which connects two straight line parts 86*j* and 86*k* with each other. In the embodiment shown in FIG. 11, the straight line part 86*j* is disposed on an inner side in the right and left direction and connected with the fixing part side spring part 86*h*. Further, the straight line part 86*k* is disposed on an outer side in the right and left direction and connected with the holding part 86*a*. Further, the fixing part side spring part 86*h* is structured of two straight line parts 86*n* and 86*p*, which are disposed to be substantially parallel to the right and left direction, and one slanted line part 86*r* which is disposed to incline with respect to the right and left direction and which connects two straight line parts 86*n* and 86*p* with each other. In the embodiment shown in FIG. 11, the straight line part 86*n* is disposed on an inner side in the front and rear direction and connected with the fixing part 86*b*. Further, the straight line part 86*p* is disposed on an outer side in the front and rear direction and connected with the holding part side spring part 86*g*.

Further, as shown in FIG. 11, two spring pieces 85 are disposed in a substantially point-symmetrical manner with respect to the center of the flat spring 87 when viewed in the optical axis direction and two spring pieces 86 are disposed in a substantially point-symmetrical manner with respect to the center of the flat spring 87 when viewed in the optical axis direction. Further, the spring pieces 85 and 86 are disposed so that the holding part side spring part 85*g* of the spring part 85*c* and the fixing part side spring part 86*h* of the spring part 86*c* are superposed on each other in the front and rear direction and the fixing part side spring part 85*h* of the spring part 85*c* and the holding part side spring part 86*g* of the spring part 86*c* are superposed on each other in the right and left direction. In the flat spring 87, the holding part side spring part 85*g* and the fixing part side spring part 86*h* which are substantially parallel to the right and left direction are a first spring part, and the fixing part side spring part 85*h* and the holding part side spring part 86*g* which are substantially parallel to the front and rear direction are a second spring part.

In the flat spring 87 structured as described above, the spring parts 85*c* and 86*c* are formed in a substantially "L"-shape which is structured so that the holding part 85*a* and 86*a* and the fixing parts 85*b* and 86*b* which are disposed on a substantially diagonal line of the photographic optical devices 1, 31 and 51 are connected with each other and thus, lengths of the spring parts 85*c* and 86*c* can be made longer. Therefore, a spring constant of the flat spring 87 can be made smaller and the movable modules 12, 42 and 62 can be swung smoothly. Further, stresses applied to the spring parts 85*c* and 86*c* can be dispersed and a stable elasticity can be obtained.

Further, in the flat spring 87, two straight line parts 86*j* and 86*k* are connected with each other through the slanted line part 86*m* and thus, in comparison with a case that the holding part side spring part 86*g* is formed in a straight line shape, a length of the holding part side spring part 86*g* can be made longer. Similarly, two straight line parts 86*n* and 86*p* are connected with each other through the slanted line part 86*r* and thus, in comparison with a case that the fixing part side spring part 86*h* is formed in a straight line shape, a length of the fixing part side spring part 86*h* can be made longer. Further, two straight line parts 86*j* and 86*k* are connected with each other through the slanted line part 86*m* and thus stress concentration of bending stress in a connected portion of the straight line part 86*j* with the straight line part 86*k* can be reduced. Similarly, two straight line parts 86*n* and 86*p* are connected with each other through the slanted line part 86*r* and thus stress concentration of bending stress in a connected portion of the straight line part 86*n* with the straight line part 86p can be reduced. Therefore, plastic deformation of the holding part side spring part 86g and the fixing part side spring part 86h can be prevented.

Further, in the flat spring 87, as shown in FIG. 11, a space is formed between the straight line part 86j, the slanted line part 86m and the fixing part side spring part 85h in the right and left direction, and a space is formed between the straight line part 86p, the slanted line part 86r and the holding part side spring part 85g in the front and rear direction. Therefore, another component for the photographic optical devices 1, 31 and 51 can be disposed in the space.

Third Modified Embodiment of Flat Spring

The flat spring 77 shown in FIG. 10 is structured of four spring pieces 76 but, as shown in FIG. 12, a flat spring 97 may be structured of two spring pieces 96.

Each of two spring pieces 96 is provided with two holding parts 96a which hold the movable modules 12, 42 and 62, two fixing parts 96b which are fixed to the support bodies 5, 35 and 55, and two spring parts 96c which connect the holding part 96a and the fixing part 96b.

The holding part 96a is formed in a substantially square shape. The holding part 96a is fixed to four corners or to vicinities of four corners of the movable modules 12, 42 and 62 when viewed in the optical axis direction. The fixing parts 96b are formed in a roughly rectangular shape and disposed at substantially centers in the right and left direction of the flat spring 97 and substantially centers in the front and rear direction. Further, the fixing parts 96b are disposed at substantially centers of inner peripheral faces of the case bodies 16 and 46 in the right and left direction and the front and rear direction.

The spring part 96c is formed in a roughly "L"-shape which is structured of the holding part side spring part 96g connected with the holding part 96a and the fixing part side spring part 96h connected with the fixing part 96b. The fixing part side spring part 96h are formed in a roughly straight line shape from the fixing parts 96b toward four corners of the flat spring 97. The holding part side spring parts 96g are formed from four corners of the flat spring 97 toward the holding parts 96a and formed so as to be turned around in the right and left direction or the front and rear direction. In other words, in the flat spring 97, the fixing part 96b and the holding part 96a which are adjacent to each other in a circumferential direction of the flat spring 97 (specifically, adjacent to each other in the clockwise direction in FIG. 12) are connected with each other through the spring part 96c.

Specifically, the fixing part 96b which is disposed at a substantially center in the right and left direction of the rear end of the flat spring 97 and the holding part 96a which is disposed on the right rear end side are connected with each other through the spring part 96c which is structured of the fixing part side spring part 96h that is formed from the fixing part 96b toward the right direction and the holding part side spring part 96g which is formed so as to be turned around in the front and rear direction. Further, the fixing part 96b which is disposed at a substantially center in the front and rear direction of the right end of the flat spring 97 and the holding part 96a which is disposed on the right front end side are connected with each other through the spring part 96c which is structured of the fixing part side spring part 96h that is formed from the fixing part 96b toward the front direction and the holding part side spring part 96g which is formed so as to be turned around in the right and left direction. In addition, the fixing part 96b which is disposed at a substantially center in the right and left direction of the front end of the flat spring 97 and the holding part 96a which is disposed on the left front end side are connected with each other through the spring part 96c which is structured of the fixing part side spring part 96h that is formed from the fixing part 96b toward the left direction and the holding part side spring part 96g which is formed so as to be turned around in the front and rear direction. Further, the fixing part 96b which is disposed at a substantially center in the front and rear direction of the left end of the flat spring 97 and the holding part 96a which is disposed on the left rear end side are connected with each other through the spring part 96c which is structured of the fixing part side spring part 96h that is formed from the fixing part 96b toward the rear direction and the holding part side spring part 96g which is formed so as to be turned around in the right and left direction.

As shown in FIG. 12, the holding part 96a which is disposed on the right rear end side and the holding part 96a which is disposed on the right front end side are connected with each other through a connecting part 96f which is formed in a straight line shape. Similarly, the holding part 96a which is disposed on the left rear end side and the holding part 96a which is disposed on the left front end side are connected with each other through a connecting part 96f.

Further, as shown in FIG. 12, two spring pieces 96 are disposed in a substantially point-symmetrical manner with respect to the center of the flat spring 97 when viewed in the optical axis direction. In the flat spring 97, the holding part side spring part 96g and the fixing part side spring part 96h which are substantially parallel to the right and left direction are a first spring part, and the holding part side spring part 96g and the fixing part side spring part 96h which are substantially parallel to the front and rear direction are a second spring part. Further, in the flat spring 97, the holding part side spring part 96g which is formed so as to be turned around in the right and left direction is a first turn-around spring part, and the holding part side spring part 96g which is formed so as to be turned around in the front and rear direction is a second turn-around spring part.

In the flat spring 97 which is structured as described above, the holding part side spring part 96g is formed so as to be turned around in the right and left direction or the front and rear direction. Therefore, even when a distance between the holding part 96a and the fixing part 96b is short, a length of the spring part 96c can be set relatively long. Accordingly, a spring constant of the flat spring 97 can be made relatively small and thus the movable modules 12, 42 and 62 can be swung smoothly. Further, a stress applied to the spring part 96c can be dispersed and a stable elasticity can be obtained.

In the embodiment shown in FIG. 12, two holding parts 96a which are disposed on the right end side are connected with each other through the connecting part 96f, and two holding parts 96a which are disposed on the left end side are connected with each other through the connecting part 96f. However, two holding parts 96a which are disposed on the right end side may not be connected with each other through the connecting part 96f, and two holding parts 96a which are disposed on the left end side may not be connected with each other through the connecting part 96f.

Other Modified Embodiments of Flat Spring

In the embodiments described above, the flat springs 17, 47 and 67 are formed in a substantially rectangular shape as a whole. However, the present invention is not limited to the embodiments. For example, the flat springs 17, 47 and 67 may be formed in a circular shape, an elliptical shape, or a polygonal shape other than a rectangular shape. Further, in the embodiments described above, the flat springs 17, 47 and 67 are provided with four spring parts 17c, 47c and 67c which are capable of deforming in the up-and-down direction, the right and left direction and the front and rear direction. However, the present invention is not limited to the embodiments. For example, the flat springs 17, 47 and 67 may be provided with three or five or more spring parts which are capable of deforming in the up-and-down direction, the right and left direction and the front and rear direction.

In the embodiments described above, the spring parts 17c, 47c and 67c are formed in a substantially "L"-shape which is structured of the first spring part that is substantially parallel to the right and left direction and the second spring part which is substantially parallel to the front and rear direction. However, the present invention is not limited to the embodiments. For example, the spring parts 17c, 47c and 67c may be formed so that two first spring parts and one second spring part are connected with each other. Alternatively, the spring parts 17c, 47c and 67c may be formed so that one first spring part and two second spring parts are connected with each other. Further, the spring parts 17c, 47c and 67c may be formed so that a plurality of first spring parts and a plurality of second spring parts are connected with each other.

In the first embodiment described above, the spring part 17c is formed from four corners of the holding part 17a toward the fixing parts 17b which are disposed at four corners of the flat spring 17. Further, in the second and third embodiments described above, the spring parts 47c and 67c are formed from substantially centers in the right and left direction or the front and rear direction of the holding parts 47a and 67a toward the fixing parts 47b and 67b which are disposed at substantially centers in the right and left direction or the front and rear direction of the flat springs 47 and 67. However, the present invention is not limited to the embodiments. For example, the spring parts 17c, 47c and 67c may be formed from intermediate positions in the right and left direction or the front and rear direction of the holding parts 17a, 47a and 67a toward the fixing parts 17b, 47b and 67b which are disposed at four corners of the flat springs 17, 47 and 67.

In the first embodiment described above, the fixing parts 17b adjacent to each other in the circumferential direction of the flat spring 17 are connected with each other through the connecting part 17f. However, the present invention is not limited to this embodiment. For example, the fixing parts 17b adjacent to each other in the circumferential direction may not be connected with each other.

In the first embodiment described above, the width "w" of the spring part 17c is not more than the thickness "t" of the spring part 17c. However, the present invention is not limited to this embodiment. For example, the width "w" of the spring part 17c may be wider than the thickness "t" of the spring part 17c. Further, in the second embodiment described above, the thickness of the spring part 47c is not more than the width of the spring part 47c, but the thickness of the spring part 47c may be larger than the width of the spring part 47c.

Other Embodiments

Although the present invention has been shown and described with reference to a specific embodiment, various changes and modifications will be apparent to those skilled in the art from the teachings herein. Other embodiments of the present invention will be described below.

In the first embodiment described above, the supporting point protruded part 11a is formed in the sensor cover member 11 and the engaging recessed part 15b is formed in the base body 15. However, the present invention is not limited to this embodiment. For example, it may be structured that a supporting point protruded part is formed in the base body 15 and an engaging recessed part which is engaged with the supporting point protruded part is formed in the sensor cover member 11. Further, in the second embodiment described above, the photographic optical device 31 is provided with the supporting point part 49 which is a swing center of the lens drive device 2, but the photographic optical device 31 may be provided with no supporting point part 49.

In the embodiments described above, the drive magnets 21, 71 and 72 are structured of two magnet pieces which are the first magnet pieces 21a, 71a and 72a and the second magnet pieces 21b, 71b and 72b. However, the present invention is not limited to the embodiments. For example, the drive magnets 21, 71 and 72 may be structured of one magnet piece. In this case, one magnet piece is magnetized so that two magnetic poles are formed on each of both sides of the drive magnets 21, 71 and 72 so as to be superposed on each other in the optical axis direction.

In the embodiments described above, the sensor 4 is disposed on a lower side of the lens drive device 2. However, the present invention is not limited to this embodiment. For example, the sensor 4 may be disposed on a right side, a left side, a front side or a rear side of the lens drive device 2. In this case, the movable modules 12, 42 and 62 are, for example, formed in a substantially rectangular shape when viewed in the optical axis direction.

In the first embodiment described above, the drive magnet 21 is attached to the cover member 9 and the drive coil 23 is attached to the case body 16. However, the present invention is not limited to this embodiment. For example, it may be structured that the drive magnet 21 is attached to the case body 16 and the drive coil 23 may be attached to the cover member 9. Similarly, in the second embodiment described above, the drive magnet 21 is attached to the cover member 39 and the drive coil 23 is attached to the coil holding member 44. However, it may be structured that the drive magnet 21 is attached to the case body 46 and the drive coil 23 may be attached to the cover member 39. Further, in the third embodiment described above, the drive magnets 71 and 72 are attached to the cover member 39 and the drive coils 73 and 74 are attached to the coil holding members 64 and 65. However, it may be structured that the drive magnets 71 and 72 are attached to the case body 46 and the drive coils 73 and 74 are attached to the cover member 39.

In the embodiments described above, the photographic optical devices 1, 31 and 51 are mounted on a portable device such as a cellular phone. However, the present invention is not limited to this embodiment. For example, the photographic optical devices 1, 31 and 51 may be mounted on a drive recorder for recording drive conditions of a car. In this case, when a variation of inclination of the lens drive device 2 due to vibration of a car during traveling is detected by the sensor 4 (in other words, a shake (vibration) of the lens drive device 2 is detected), an electric current is supplied to the drive coil 23 on the basis of a detection result of the sensor 4 and the movable modules 12 and 42 are swung with the supporting point parts 19 and 49 as a center to correct the shake. Alternatively, when a variation of inclination of the lens drive device 2 due to vibration of a car during traveling is detected by the sensor 4, an electric current is supplied to the drive coil 23 on the basis of a detection result of the sensor 4 and the movable module 62 is swung with the swing center 69 as a center to correct the shake. Further, the photographic optical devices 1, 31 and 51 may be mounted on another device such as a monitor camera.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A photographic optical device comprising:
   a lens drive device on which a lens, an imaging element, and a lens drive mechanism for driving the lens are mounted;
   a movable module which is provided with the lens drive device;
   a support body which supports the movable module; and
   a shake correction mechanism which swings the movable module so that an optical axis of the lens drive device is inclined with respect to the support body to correct a shake;
   wherein the shake correction mechanism comprises:
     a swing drive mechanism for swinging the movable module; and
     a spring member which swingably supports the movable module; and
   wherein the spring member comprises:
     a holding part which holds the movable module;
     a fixing part which is fixed to the support body; and
     a spring part which connects the holding part with the fixing part and is capable of performing a swing operation of the movable module, the spring part being deformable in a direction perpendicular to the optical axis and an optical axis direction;
   the spring member is formed in a substantially rectangular shape as a whole and an outer peripheral end of the spring member is disposed to be substantially parallel to the first direction or the second direction,
   the fixing part is disposed at a substantially center of the first direction of the spring member and a substantially center of the second direction,
   the holding part is formed so that an external shape of the holding part is a substantially rectangular shape, and
   the spring member is provide with the spring part which is formed from the substantially center of the holding part in the first direction toward the fixing part that is disposed at the substantially center of the second direction, and the spring part which is formed from the substantially center of the holding part in the second direction toward the fixing part that is disposed at the substantially center of the first direction.

2. The photographic optical device according to claim 1, wherein
   the swing drive mechanism is provided with a plurality of drive magnets and a plurality of drive coils for swinging the movable module with a first direction and a second direction, which are substantially perpendicular to the optical axis and substantially perpendicular to each other, as axial directions, and
   the spring part is provided with a first spring part which is substantially parallel to the first direction and a second spring part which is substantially parallel to the second direction.

3. The photographic optical device according to claim 2, wherein
   the movable module is formed in a substantially rectangular shape when viewed in the optical axis direction and whose outer peripheral face is disposed to be substantially parallel to the first direction or the second direction, and
   the spring member is formed in a substantially rectangular shape as a whole when viewed in the optical axis direction and an outer peripheral end of the spring member is disposed to be substantially parallel to the first direction or the second direction.

4. The photographic optical device according to claim 3, wherein the first spring part and the second spring part are disposed between the outer peripheral face of the movable module and the outer peripheral end of the spring member.

5. The photographic optical device according to claim 4, wherein
   the lens drive device is covered by a cover member which is formed of magnetic material and formed in a substantially rectangular tube shape, and an outer side face of the cover member is fixed with the drive magnet structuring the swing drive mechanism, and
   the support body is provided with a case body which is formed in a substantially rectangular tube shape and covers the cover member, and the drive coil is fixed to an inner side face of the case body.

6. The photographic optical device according to claim 2, wherein the shake correction mechanism is provided with a supporting point part which is a supporting point when the movable module is swung, and the movable module is swing with the supporting point part as a center.

7. The photographic optical device according to claim 6, wherein the spring part is formed in a substantially "L"-shape which is structured of the first spring part and the second spring part.

8. The photographic optical device according to claim 7, wherein
   the movable module is formed in a substantially rectangular shape when viewed in the optical axis direction,
   the spring member is formed in a substantially rectangular shape as a whole,
   the fixing part is disposed at four corners of the spring member,
   the holding part is disposed at four corners or vicinities of the four corners of the movable module when viewed in the optical axis direction,
   the spring part is formed to connect the holding part with the fixing part which are disposed on a substantially diagonal line of the spring member, and
   the first spring part of one spring part and the first spring part of another spring part are superposed on each other in the second direction, and the second spring part of one spring part and the second spring part of another spring part are superposed on each other in the first direction.

9. The photographic optical device according to claim 8, wherein the spring member is structured of four spring pieces in a substantially "L"-shape each of which is provided with the one holding part, the one fixing part, and the one spring part.

10. The photographic optical device according to claim 7, wherein
    the movable module is formed in a substantially rectangular shape when viewed in the optical axis direction and whose outer peripheral face is disposed to be substantially parallel to the first direction or the second direction,
    the spring member is formed in a substantially rectangular shape as a whole and an outer peripheral end of the spring member is disposed to be substantially parallel to the first direction or the second direction, the fixing part is disposed at a substantially center of the first direction of the spring member and a substantially center of the second direction, the holding part is disposed at four corners or vicinities of the four corners of the movable module when viewed in the optical axis direction, and the spring member is provided with the spring part having a first turn-around spring part which is formed to be turned around in the first direction as the first spring part, and the spring part having a second turn-around spring part which is formed to be turned around in the second direction as the second spring part.

11. The photographic optical device according to claim 10, wherein the spring member is structured of two spring pieces each of which is provided with the two holding parts, the two fixing parts, the one spring part having the first turn-around spring part, and the one spring part having the second turn-around spring part.

12. The photographic optical device according to claim 6, wherein the spring member is provided with a plurality of the spring parts, and the first spring part of one spring part and the first spring part of another spring part are superposed on each other in the second direction, and the second spring part of one spring part and the second spring part of another spring part are superposed on each other in the first direction.

13. The photographic optical device according to claim 6, wherein the spring member is fixed to the support body in a resiliently bent state so as to generate pressurization for abutting the movable module with the supporting point part.

14. The photographic optical device according to claim 13, wherein the support body is provided with a base body which is fixed to a lower end side of the case body to structure the support body together with the case body, the movable module is provided with a sensor for detecting a variation of inclination of the lens drive device, and the sensor is disposed in an inside of a sensor cover member which is fixed to a lower end of the cover member, and a supporting point part which is a supporting point for swing of the lens drive device is provided between a bottom part of the sensor cover member and the base body.

15. The photographic optical device according to claim 1, wherein a holding part side end of the spring part which is formed from the substantially center of the holding part in the first direction toward the fixing part that is disposed at the substantially center of the second direction and a fixing part side end of the spring part which is formed from the substantially center of the holding part in the second direction toward the fixing part that is disposed at the substantially center of the first direction are adjacent to each other in the first direction, and a holding part side end of the spring part which is formed from the substantially center of the holding part in the second direction toward the fixing part that is disposed at the substantially center of the first direction and a fixing part side end of the spring part which is formed from the substantially center of the holding part in the first direction toward the fixing part that is disposed at the substantially center of the second direction are adjacent to each other in the second direction.

16. The photographic optical device according to claim 1, wherein the spring member is disposed in a vicinity of a swing center of the movable module in the optical axis direction.

17. The photographic optical device according to claim 16, wherein a spring constant of the spring part in the optical axis direction is not more than a spring constant of the spring part in a direction perpendicular to the optical axis.

18. The photographic optical device according to claim 1, wherein the spring member is disposed on a swing center side of the movable module with respect to the swing drive mechanism in the optical axis direction.

19. The photographic optical device according to claim 18, wherein a spring constant of the spring part in the optical axis direction is not more than a spring constant of the spring part in a direction perpendicular to the optical axis.

20. The photographic optical device according to claim 1, wherein the movable module is provided with a sensor for detecting a variation of inclination of the lens drive device.

* * * * *